United States Patent
Li et al.

(10) Patent No.: US 7,627,429 B2
(45) Date of Patent: Dec. 1, 2009

(54) METHOD FOR PRODUCING UNDERGROUND DEPOSITS OF HYDROCARBON FROM AN EARTH FORMATION USING FAULT INTERPRETATION INCLUDING SPLINE FAULT TRACKING

(75) Inventors: Cen Li, Missouri City, TX (US); Zhenghan Deng, Katy, TX (US); Bruce Cornish, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 217 days.

(21) Appl. No.: 11/700,565

(22) Filed: Jan. 31, 2007

(65) Prior Publication Data
US 2008/0071477 A1     Mar. 20, 2008

Related U.S. Application Data

(60) Provisional application No. 60/845,068, filed on Sep. 15, 2006.

(51) Int. Cl.
*G01V 9/00* (2006.01)

(52) U.S. Cl. .......................................... 702/11; 702/14

(58) Field of Classification Search ..................... 702/2, 702/6, 9, 11–14, 156, 189; 175/30; 367/37, 367/38, 73
See application file for complete search history.

(56) References Cited

U.S. PATENT DOCUMENTS

| 5,537,320 | A |   | 7/1996  | Simpson et al. ............ 702/14 |
| 5,838,564 | A | * | 11/1998 | Bahorich et al. ........... 702/16 |
| 5,999,885 | A |   | 12/1999 | Van Bemmel et al. ....... 702/14 |
| 6,018,498 | A |   | 1/2000  | Neff |
| 6,940,507 | B2|   | 9/2005  | Repin |
| 2003/0089837 | A1 | * | 5/2003 | Marold .................... 250/201.2 |

* cited by examiner

*Primary Examiner*—Manuel L Barbee
(74) *Attorney, Agent, or Firm*—Robert P. Lord; Bryan P. Galloway

(57) ABSTRACT

A method is disclosed for determining a fault surface in a formation, comprising: determining a first plurality of cross-correlation values for a 3D Volume associated, respectively, with a corresponding first plurality of 3D Volumes, and selecting a first minimum one of the first plurality of cross-correlation values, a first derived fault segment corresponding to the first minimum one of the first plurality of crosscorrelation values, the first derived fault segment approximately lying on the fault surface and tending to determine the fault surface in the formation.

21 Claims, 16 Drawing Sheets

$$C(A,B) = \frac{2\sum_{i=1,N} A_i B_i}{\sum_{i=1,N}(A_i^2 + B_i^2)}$$

$$C(A,B) = \frac{2[A1(1)B1(1)+A2(1)B2(1)+A1(2)B1(2)+A2(2)B2(2)]}{[A1(1)^2+A1(2)^2+A2(1)^2+A2(2)^2+B1(1)^2+B1(2)^2+B2(1)^2+B2(2)^2]}$$

$$C(A,B) = 2 \sum_{i,j,k} (A_{ijk} * B_{ijk}) / \sum_{i,j,k} (A_{ijk}^2 + B_{ijk}^2)$$

METHOD FOR PRODUCING UNDERGROUND DEPOSITS OF HYDROCARBON FROM AN EARTH FORMATION USING FAULT INTERPRETATION INCLUDING SPLINE FAULT TRACKING

CROSS REFERENCE TO RELATED APPLICATIONS

This is a application of Provisional Application Ser. No. 60/845,068, filed Sep. 15, 2006, and entitled "Method for Producing Underground Deposits of Hydrocarbon from an Earth Formation Using Fault Interpretation including Spline Fault Tracking".

BACKGROUND

The subject matter disclosed in this specification relates to a method, including a corresponding system and computer program and program storage device, for producing underground deposits of hydrocarbon, including oil and gas, from an Earth formation using Fault Interpretation including a method known as Spline Fault Tracking for determining and generating a fault surface.

Fault interpretation in 3D volumes has increasingly become a focal area in the seismic interpretation industry. The trend is to move away from the traditional line-by-line manual picking in order to adopt a more efficient and automated solution. The method, and the corresponding system and computer program and program storage device, disclosed in this specification offers a unique way to automatically detect faults in 3D volumes using a method known as 'Spline Fault Tracking (SFT)'. The following two U.S. Patents relate to identifying fault curves or fault cuts in seismic data: U.S. Pat. No. 5,999,885 to Van Bemmel et al, and U.S. Pat. No. 5,537,320 to Simpson et al.

SUMMARY

One aspect of the present invention involves a method of producing underground deposits of hydrocarbon from a formation, comprising: determining a fault surface in the formation, the step of determining the fault surface in the formation including, determining a first plurality of crosscorrelation values for a 3D Volume associated, respectively, with a corresponding first plurality of 3D Volumes, and selecting a first minimum one of the first plurality of crosscorrelation values, a first derived fault segment corresponding to the first minimum one of the first plurality of crosscorrelation values, the first derived fault segment approximately lying on the fault surface; and when the fault surface is determined, drilling the formation in order to produce the underground deposits of hydrocarbon from the formation.

A further aspect of the present invention involves a system adapted for producing underground deposits of hydrocarbon from a formation, comprising: apparatus adapted for determining a fault surface in the formation, the apparatus adapted for determining the fault surface in the formation including, apparatus adapted for determining a first plurality of crosscorrelation values for a 3D Volume associated, respectively, with a corresponding first plurality of 3D Volumes, and apparatus adapted for selecting a first minimum one of the first plurality of crosscorrelation values, a first derived fault segment corresponding to the first minimum one of the first plurality of crosscorrelation values, the first derived fault segment approximately lying on the fault surface; and apparatus adapted for drilling the formation in order to produce the underground deposits of hydrocarbon from the formation on the condition that the fault surface is determined.

A further aspect of the present invention involves a method for determining a fault surface in a formation, comprising: determining a first plurality of crosscorrelation values for a 3D Volume associated, respectively, with a corresponding first plurality of 3D Volumes, and selecting a first minimum one of the first plurality of crosscorrelation values, a first derived fault segment corresponding to the first minimum one of the first plurality of crosscorrelation values, the first derived fault segment approximately lying on the fault surface and tending to determine the fault surface in the formation.

A further aspect of the present invention involves a program storage device readable by a machine tangibly embodying a set of instructions executable by the machine to perform method steps for determining a fault surface in a formation, the method steps comprising: determining a first plurality of crosscorrelation values for a 3D Volume associated, respectively, with a corresponding first plurality of 3D Volumes, and selecting a first minimum one of the first plurality of crosscorrelation values, a first derived fault segment corresponding to the first minimum one of the first plurality of crosscorrelation values, the first derived fault segment approximately lying on the fault surface and tending to determine the fault surface in the formation.

A further aspect of the present invention involves a computer program adapted to be executed by a processor, the computer program, when executed by the processor, conducting a process for determining a fault surface in a formation, the process comprising: determining a first plurality of crosscorrelation values for a 3D Volume associated, respectively, with a corresponding first plurality of 3D Volumes, and selecting a first minimum one of the first plurality of crosscorrelation values, a first derived fault segment corresponding to the first minimum one of the first plurality of crosscorrelation values, the first derived fault segment approximately lying on the fault surface and tending to determine the fault surface in the formation.

A further aspect of the present invention involves a system adapted for determining a fault surface in a formation, comprising: apparatus adapted for determining a first plurality of crosscorrelation values for a 3D Volume associated, respectively, with a corresponding first plurality of 3D Volumes, and apparatus adapted for selecting a first minimum one of the first plurality of crosscorrelation values, a first derived fault segment corresponding to the first minimum one of the first plurality of crosscorrelation values, the first derived fault segment approximately lying on the fault surface.

A further aspect of the present invention involves a method of determining a fault surface, comprising: (a) creating and projecting a first seed segment and adjusting a target segment to a first position thereby generating a first volume extending between the first seed segment and the target segment at the first position; the first volume including a first plurality of voxels having a corresponding first plurality of voxel values; (b) calculating a first crosscorrelation value $C1(A,B)$ corresponding to the first volume in response to the first plurality of voxel values; (c) adjusting the target segment to a second position thereby generating a second volume extending between the first seed segment and the target segment at the second position; the second volume including a second plurality of voxels having a corresponding second plurality of voxel values; (d) calculating a second crosscorrelation value $C2(A,B)$ corresponding to the second volume in response to the second plurality of voxel values; (e) determining a minimum one of the C1(A,B) and the C2(A,B), and selecting a first derived fault segment which corresponds to the minimum one of the C1(A,B) and the C2(A,B), the first derived fault segment lying on the fault surface and tending to determine the fault surface.

A further aspect of the present invention involves a program storage device readable by a machine tangibly embodying a set of instructions executable by the machine to perform method steps for determining a fault surface, the method steps comprising: (a) creating and projecting a first seed segment and adjusting a target segment to a first position thereby generating a first volume extending between the first seed segment and the target segment at the first position; the first volume including a first plurality of voxels having a corresponding first plurality of voxel values; (b) calculating a first crosscorrelation value C1(A,B) corresponding to the first volume in response to the first plurality of voxel values; (c) adjusting the target segment to a second position thereby generating a second volume extending between the first seed segment and the target segment at the second position; the second volume including a second plurality of voxels having a corresponding second plurality of voxel values; (d) calculating a second crosscorrelation value C2(A,B) corresponding to the second volume in response to the second plurality of voxel values; (e) determining a minimum one of the C1(A,B) and the C2(A,B), and selecting a first derived fault segment which corresponds to the minimum one of the C1(A,B) and the C2(A,B), the first derived fault segment lying on the fault surface and tending to determine the fault surface.

A further aspect of the present invention involves a computer program adapted to be executed by a processor, the computer program, when executed by the processor, conducting a process for determining a fault surface, the process comprising: (a) creating and projecting a first seed segment and adjusting a target segment to a first position thereby generating a first volume extending between the first seed segment and the target segment at the first position; the first volume including a first plurality of voxels having a corresponding first plurality of voxel values; (b) calculating a first crosscorrelation value C1(A,B) corresponding to the first volume in response to the first plurality of voxel values; (c) adjusting the target segment to a second position thereby generating a second volume extending between the first seed segment and the target segment at the second position; the second volume including a second plurality of voxels having a corresponding second plurality of voxel values; (d) calculating a second crosscorrelation value C2(A,B) corresponding to the second volume in response to the second plurality of voxel values; (e) determining a minimum one of the C1(A,B) and the C2(A,B), and selecting a first derived fault segment which corresponds to the minimum one of the C1(A,B) and the C2(A,B), the first derived fault segment lying on the fault surface and tending to determine the fault surface.

Further scope of applicability will become apparent from the detailed description presented hereinafter. It should be understood, however, that the detailed description and the specific examples set forth below are given by way of illustration only, since various changes and modifications within the spirit and scope of the 'Fault Interpretation Software including Spline Fault Tracking', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein.

DETAILED DESCRIPTION

Figure 1:
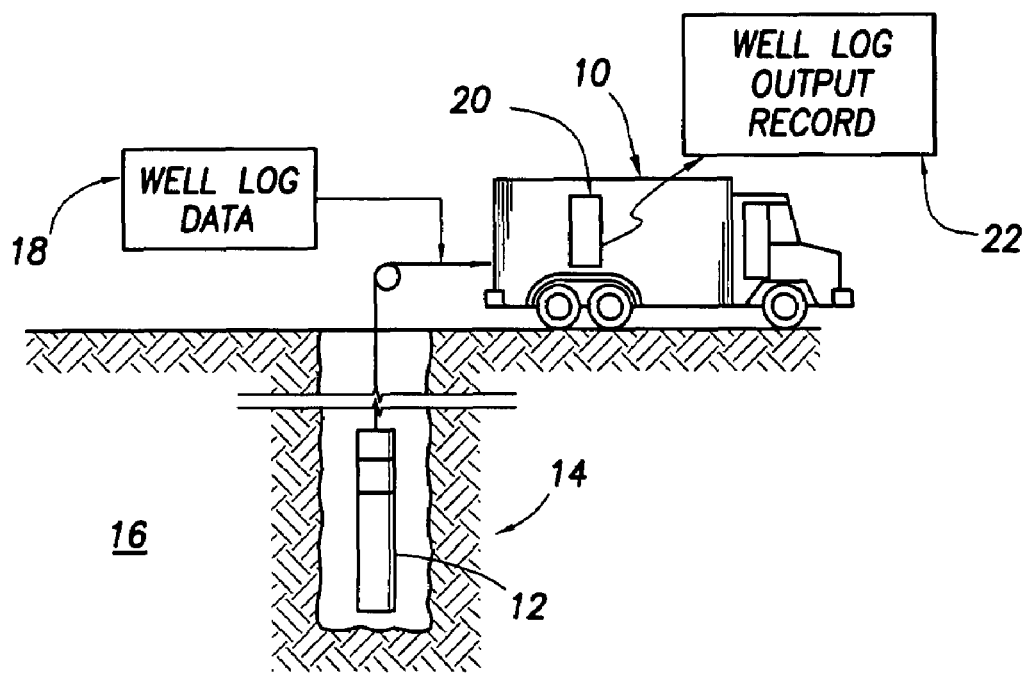
FIGS. 1 and 2 illustrate a method for generating a well log output record.

Fault interpretation in 3D volumes has increasingly become a focal area in the seismic interpretation industry. The trend is to move away from the traditional line-by-line manual picking to adopt more efficient and automated solutions. The method disclosed in this specification offers a unique way to automatically detect faults in 3D volumes using a method known as 'Spline Fault Tracking (SFT)'. The SFT method receives a user defined fault segment as original input. The original fault segment is used as seed to track subsequent segments in the volume. The SFT method does not require an initial computation of coherence volumes. However, the SFT method can directly work on seismic volumes as well as coherence volumes. Auto-generated fault segments can be manual adjusted to better adapt to the changing fault plane characteristics. Manually adjusted segments can then become new seeds to refine tracking. Based on the SFT method disclosed in this specification, a track-and-edit fault interpretation can be developed to seamlessly combine automation with manual guidance and intervention.

The SFT method disclosed here uses a 'user given fault segment' as seed and propagates it forward (and/or backward) to create target segments. A 'target segment' is automatically adjusted to fit into best position by searching for 'minimum voxel correlation (MVC)'. Subsequently, the target segments are further propagated forward (or backward) to generate more target segments. The propagation is along a fixed direction (norm to seed segment) so all the fault segments are parallel to each other. The stride between two adjacent fault segments is user configurable. A fault plane is thus created draping across the fault segments.

Voxel correlation is computed by taking a thin layer of voxels on each side of the fault plane. If the voxel layers are denoted A and B, and if the thickness of the layers is N voxels, the voxel correlation is:

$$C(A, B) = \frac{2 \sum_{i=1,N} A_i B_i}{\sum_{i=1,N} (A_i^2 + B_i^2)}$$

A target segment is reshaped and repositioned as a spline to search for a minimum crosscorrelation value C(A,B). FIGS. 8 through 24 illustrate the situation while propagating from a seed segment to a target segment using Minimum Voxel Correlation (MVC) criteria. Voxel correlation is concentrated on a limited area near the fault plane thus allowing fast and localized computations.

A Coherence volume is not needed in order to use the Spline Fault Tracking (SFT) method in connection with 'Minimum Voxel Correlation (MVC)'. However, if a coherence volume is available, the SFT method can also utilize it for tracking. Instead of using MVC across the fault plane, the SFT method can use the voxel values on the fault plane and maximize the average voxel value while growing the fault segments.

Multiple seed segments can be used with the SFT method disclosed in this specification. When growing between two seed segments, a target segment is the linear interpolation of its two adjacent segments. 'Tracking in between two seed segments' is more accurate than 'open-ended single seed tracking'.

After tracking, 'newly created segments' can then be 'manually adjusted' in order to better fit to the fault surface. The tracking process can then be restarted using those 'manually adjusted segments' as 'additional seeds' to refine tracking. Based on the SFT method disclosed herein, an iterative track-and-edit workflow is defined in order to seamlessly combine both 'auto tracking' and 'manual interventions'.

Refer now to FIGS. 1 through 7B of the drawings.

In FIG. 1, a well logging truck 10 lowers a logging tool 12 into the wellbore 14 and the logging tool 12 stimulates and energizes the Earth formation 16. In response, sensors in the logging tool 12 receive signals from the formation 16, and, in response thereto, other signals representative of well log data 18 propagate uphole from the logging tool 12 to a well logging truck computer 20. A well log output record 22 is generated by the well logging truck computer 20 which displays the well log data 18.

Figure 2:
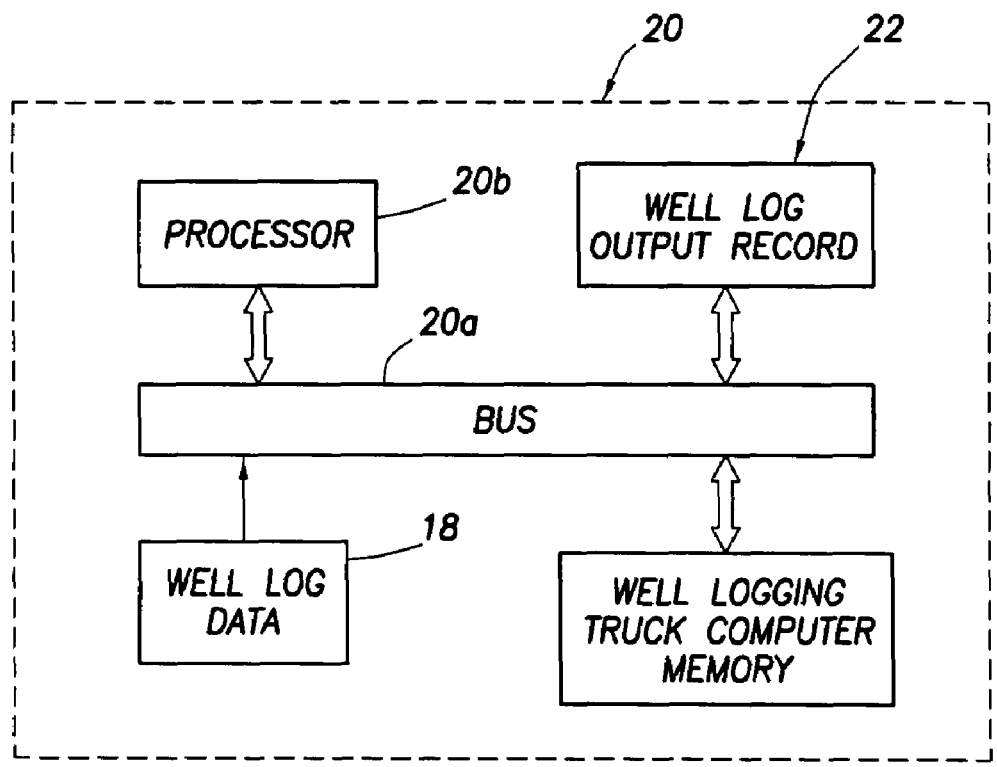

In FIG. 2, a more detailed construction of the well logging truck computer 20 is illustrated. A bus 20a receives the well log data 18 and, responsive thereto, the well log output record 22 is generated by the processor 20b, the well log output record 22 displaying and/or recording the well log data 18. The well log output record 22 is input to the interpretation workstation of FIGS. 6 and 7A.

Figure 3:
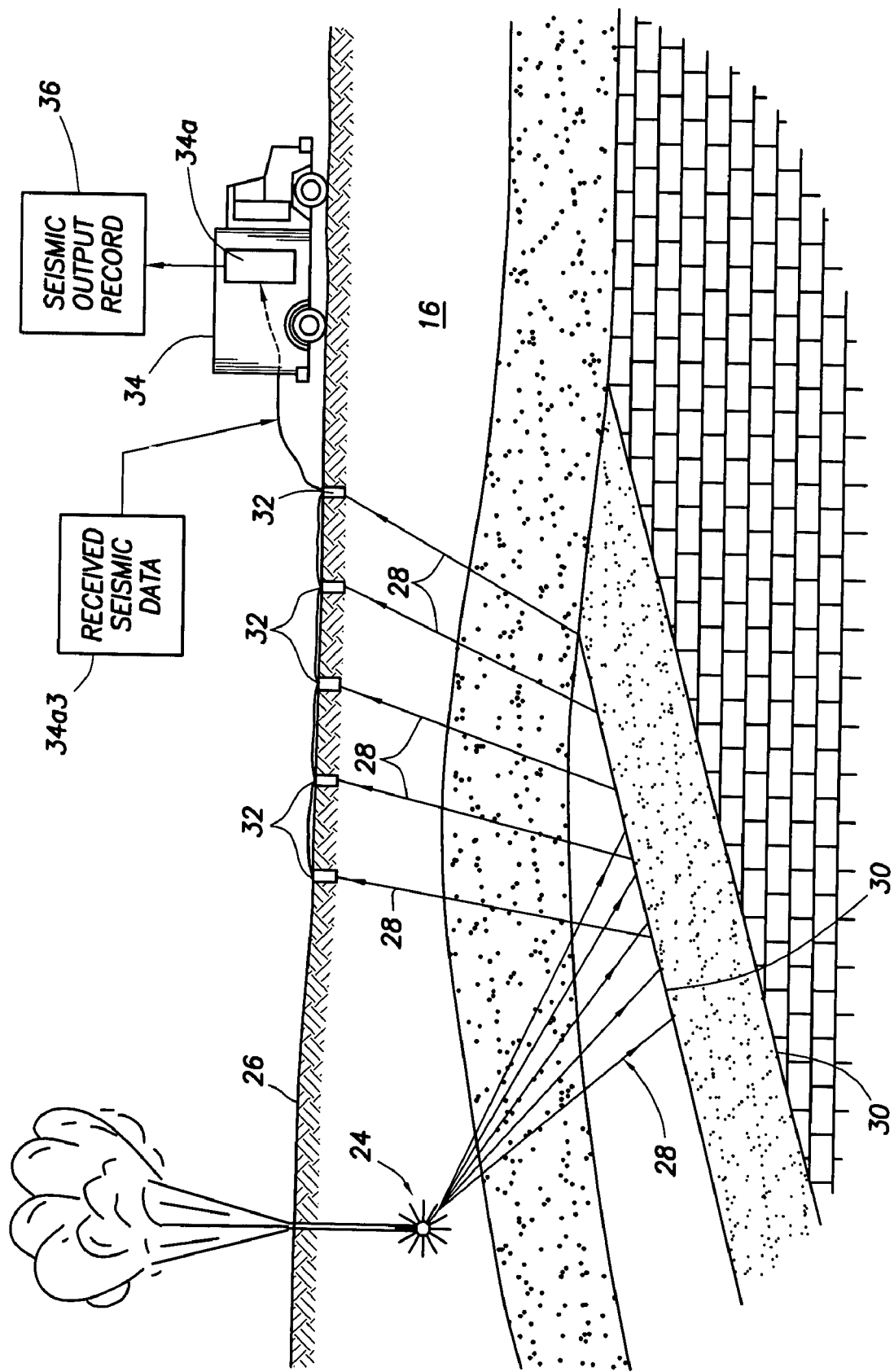
FIGS. 3, 4, and 5 illustrate a method for generating a reduced seismic data output record.

In FIG. 3, an apparatus and associated method for performing a three dimensional (3D) seismic operation at a location on the earth's surface near the wellbore of FIG. 1 is illustrated.

In FIG. 3, an explosive or acoustic energy source 24 situated below the surface of the earth 26 detonates and generates a plurality of sound or acoustic vibrations 28 which propagate downwardly and reflect off a horizon layer 30 within the Earth formation 16. The horizon layer 30 could be a top layer of rock or sand or shale. When the sound vibrations reflect off the horizon layer 30, the sound vibrations 28 will propagate upwardly and will be received in a plurality of receivers 32 called geophones 32 situated at the surface of the earth. The plurality of geophones 32 will each generate an electrical signal in response to the receipt of a sound vibration therein and a plurality of electrical signals will be generated from the geophones 32, the plurality of signals (referred to as 'received seismic data 34a3') being received in a recording truck 34. The plurality of electrical signals from the geophones 32 (that is, the 'received seismic data' 34a3) represent a set of characteristics of the earth formation including the horizons 30 located within the earth below the geophones 32. The recording truck 34 contains a computer 34a which will receive and store the plurality of signals received from the geophones 32. A seismic output record 36 will be generated from the computer 34a in the recording truck 34 which will include and/or display and/or store the plurality of electrical signals that are representative of the characteristics of the earth formation including the horizons 30 located within the earth below the geophones 32.

Figure 4:
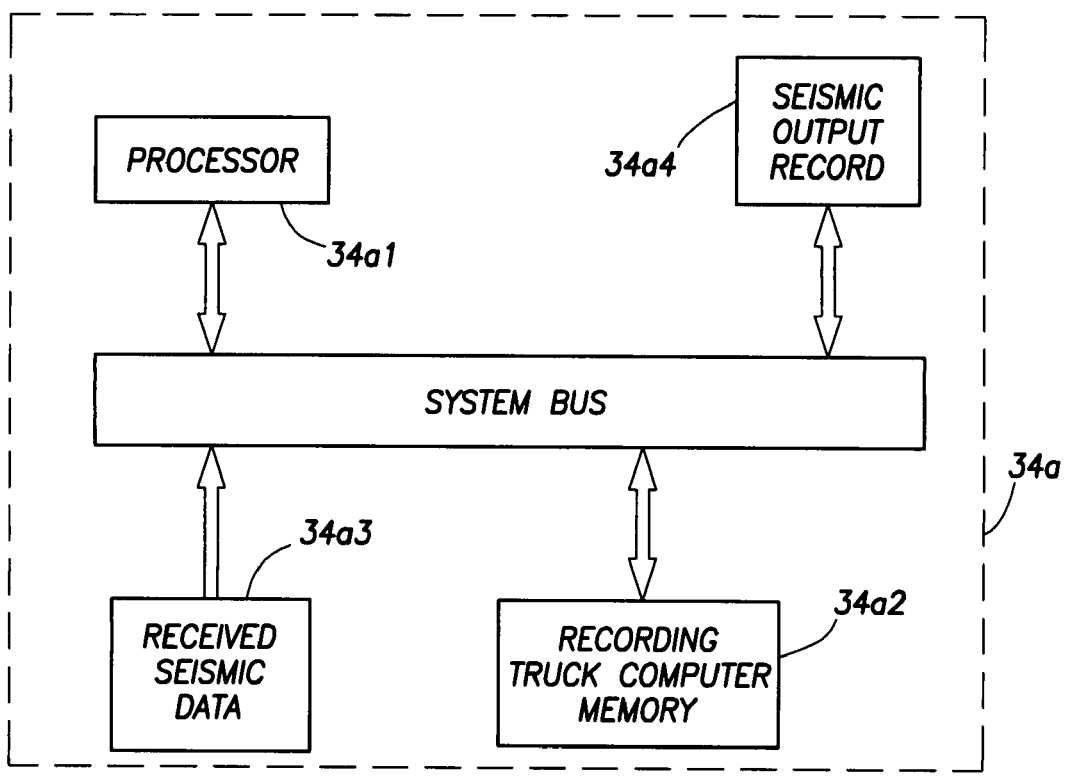

In FIG. 4, a more detailed construction of the recording truck computer 34a is illustrated. The recording truck computer 34a of FIG. 3 includes a processor 34a1 and a memory 34a2 connected to a system bus. The electrical signals, received from the geophones 32 during the 3D seismic operation and referred to as the 'received seismic data' 34a3, would be received into the recording truck computer 34a via the "Received Seismic Data" block 34a3 in FIGS. 3 and 4 and would be stored in the memory 34a2 of the recording truck computer 34a. When desired, a seismic output record 34a4 is generated by the recording truck computer 34a, the seismic output record 34a4 being adapted for recording and displaying "a plurality of seismic data" representing the 'received seismic data' traces or sets of electrical signals received by the recording truck computer 34a from the geophones 32.

Figure 5:
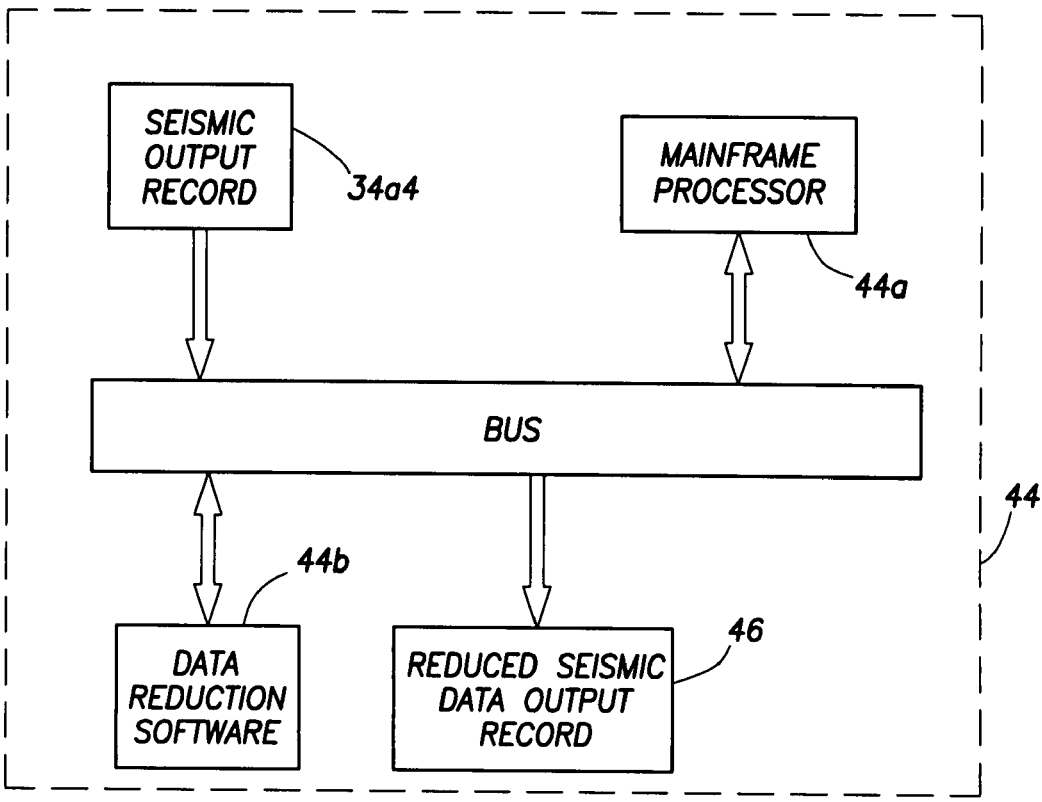

In FIG. 5, a simplified diagram of a mainframe computer 44 is illustrated which uses a stored "data reduction software" to perform a "data reduction" operation on the "plurality of seismic data" included in the seismic output record 34a4 of FIG. 4. The mainframe computer 44 produces a "reduced seismic data output record" 46 in FIG. 5 which is adapted for recording and displaying information that represents "reduced" versions of the "plurality of seismic data" included in the seismic output record 34a4 of FIG. 5. The mainframe computer 44 of FIG. 5 includes a mainframe processor 44a connected to a system bus and a memory 44b also connected to the system bus which stores a "data reduction software" therein. The seismic output record 34a4 of FIG. 4, which includes the "plurality of seismic data", is connected to the system bus of the mainframe computer 44 of FIG. 5. As a result, the "plurality of seismic data", included in the seismic output record 34a4 of FIG. 5, is now being input to the mainframe processor 44a of FIG. 5. The processor 44a of the mainframe computer 44 in FIG. 5 executes the "data reduction software" stored in the memory 44b of the mainframe computer. The "data reduction software", which is stored in the memory 44b of the mainframe computer 44 of FIG. 5, can be found in a book entitled "Seismic Velocity Analysis and the Convolutional Model", by Enders A. Robinson, the disclosure of which is incorporated by reference into this specification. When the "data reduction software" in memory 44b is executed, the mainframe processor 44a will perform a "data reduction" operation on the "plurality of seismic data" that is included in the seismic output record 34a4 of FIG. 5. When the "data reduction operation" is complete, the mainframe processor 44a will generate a "reduced seismic data output record" 46 which will record and is adapted for displaying information representing a "reduced version" of the "plurality of seismic data" included in the seismic output record 34a4 of FIG. 5, and including a set of characteristics pertaining to the earth formation located near the wellbore of FIG. 1, the characteristics including the location and structure of the horizons 30 of FIG. 3.

Figure 6:
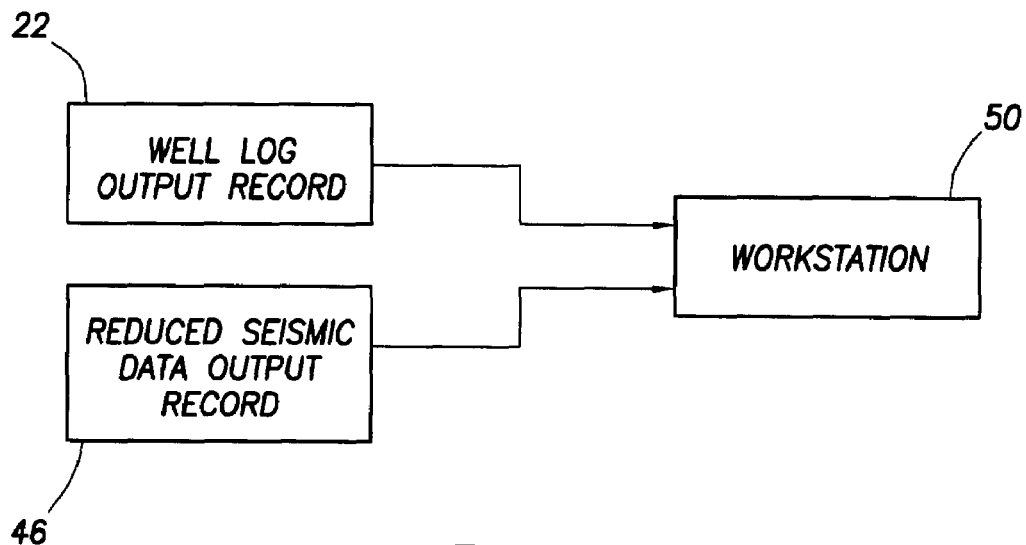
FIGS. 6, 7A, and 7B illustrate a workstation or other computer system which receives the well log output record and the reduced seismic data output record adapted for generating a fault surface that is adapted to be recorded or displayed on an 'output display' of a recorder or display device of the computer system.

In FIG. 6, the well log output record 22 of FIG. 1 and the reduced seismic data output record 46 of FIG. 5 are both input to an interpretation workstation or other computer system 50. This computer system 50 stores a novel 'Fault Interpretation Software including Spline Fault Tracking' which practices a new 'Spline Fault Tracking (SFT)' method that is adapted for automatically constructing a fault surface disposed within the Earth formation.

Figure 7A:
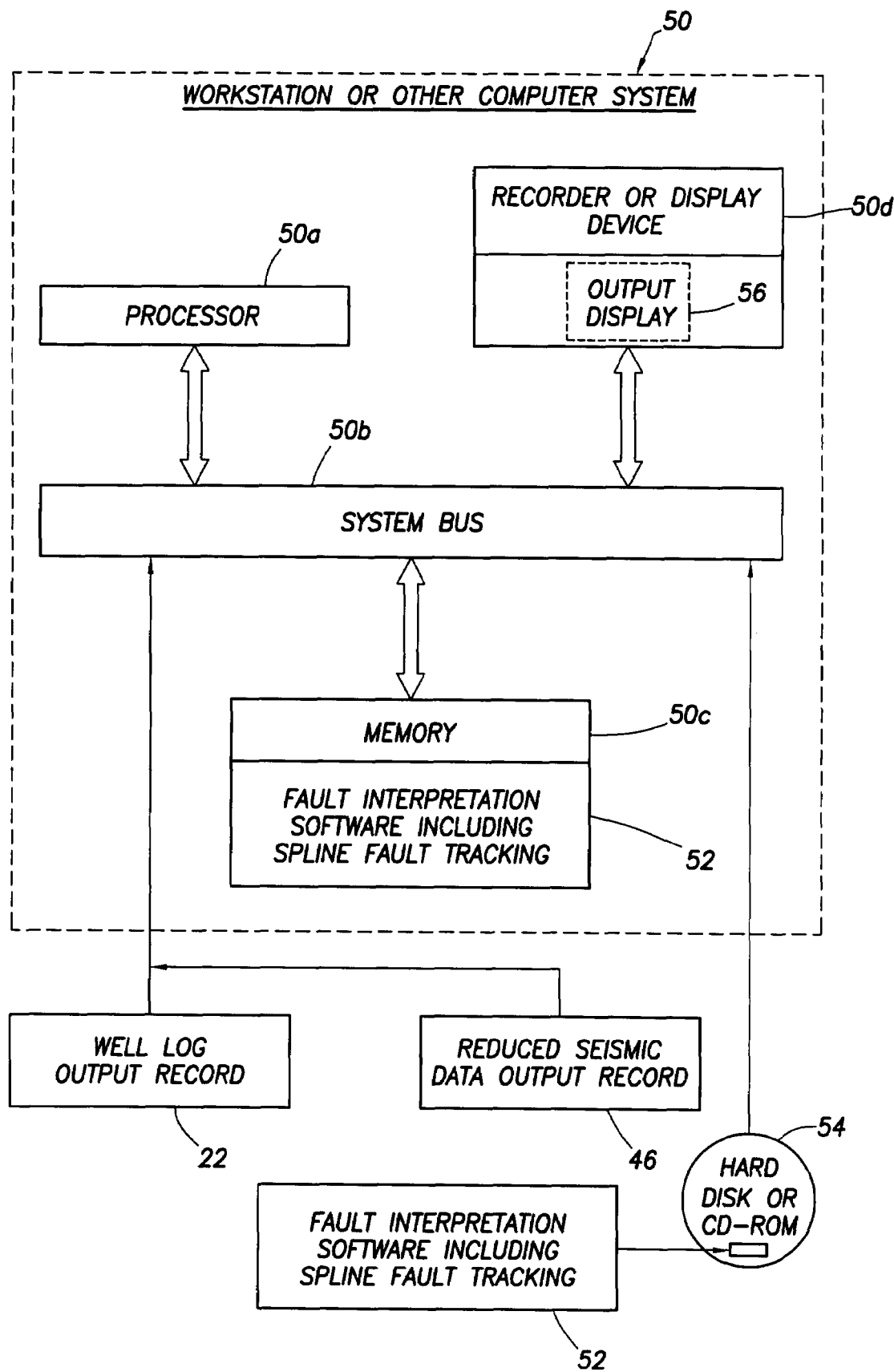
Figures 7B, 8:
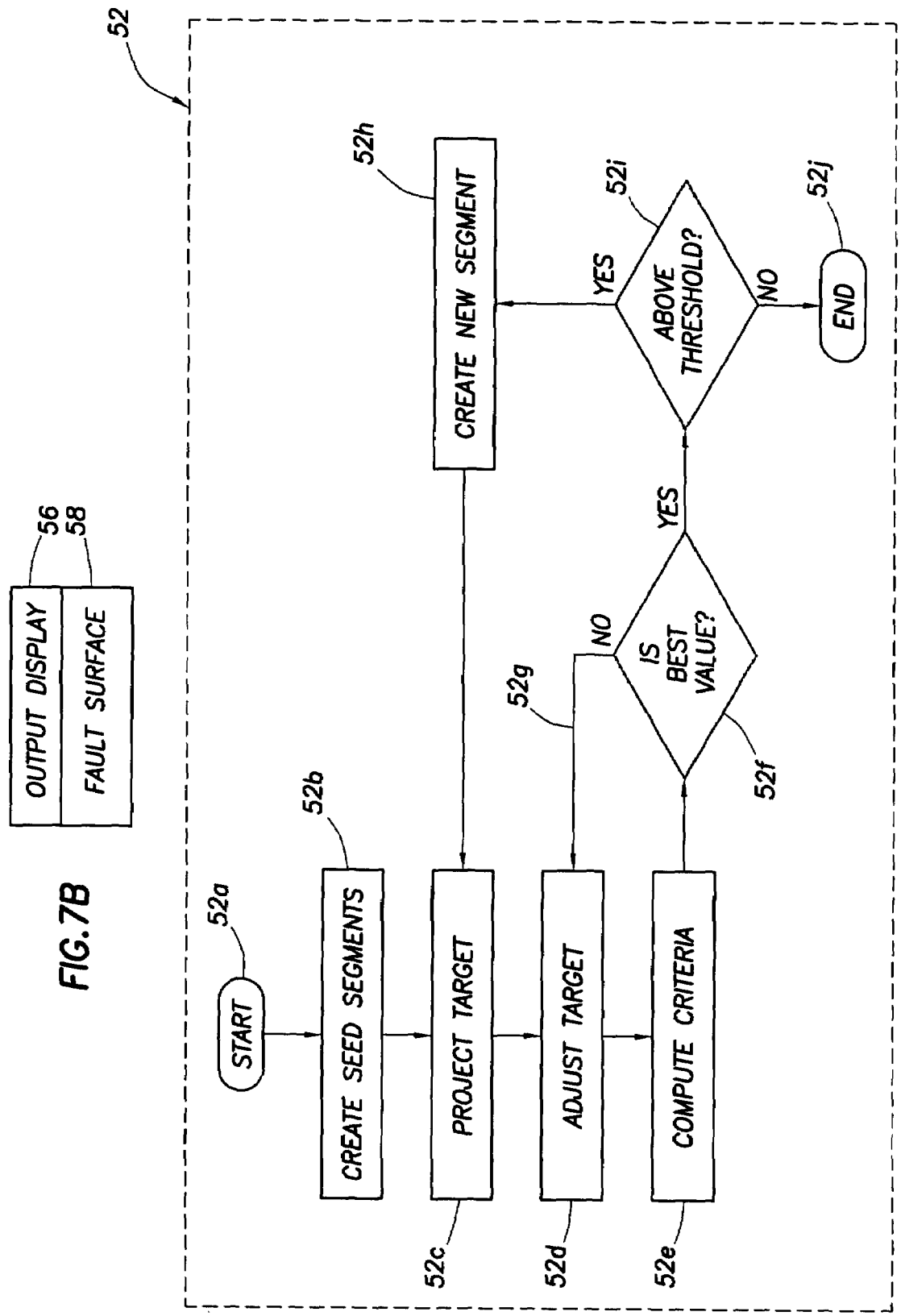
FIG. 8 illustrates a flowchart representing a construction and a functional operation of the 'Fault Interpretation Software including Spline Fault Tracking' that is adapted to be stored in the workstation or other computer system of FIG. 7A.
Figures 19, 20, 24:
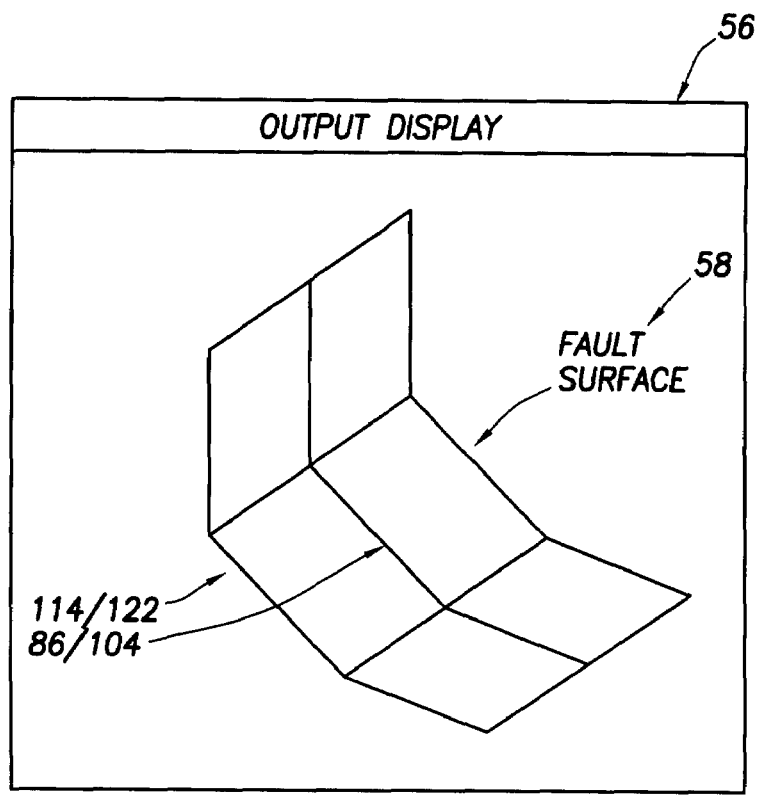

Referring to FIGS. 7A, 7B and 24, a workstation or other computer system 50, as shown in FIG. 7A, is illustrated, the computer system 50 of FIG. 7A storing a novel 'Fault Interpretation Software including Spline Fault Tracking' 52 that is adapted for automatically generating a 'fault surface' 58.

In FIG. 7A, a workstation, personal computer, or other computer system 50 is illustrated adapted for storing a 'Fault Interpretation Software including Spline Fault Tracking' 52. The computer system 50 of FIG. 7A includes a Processor 50a operatively connected to a system bus 50b, a memory or other program storage device 50c operatively connected to the system bus 50b, and a recorder or display device 50d operatively connected to the system bus 50b. The memory or other program storage device 50c stores a 'Fault Interpretation Software including Spline Fault Tracking' 52 that practices the new 'Spline Fault Tracking (SFT)' method or technique that is disclosed in this specification. The 'Fault Interpretation Software including Spline Fault Tracking' 52, which is stored in the memory 50c of FIG. 7A, can be initially stored on a CD-ROM or a DVD-ROM 54, where that CD-ROM or DVD-ROM 54 is also a 'program storage device'. That CD-ROM or DVD-ROM 54 can be inserted into the computer system 50, and the 'Fault Interpretation Software including Spline Fault Tracking' 52 can be loaded from that CD-ROM or DVD-ROM 54 and into the memory/program storage device 50c of the computer system 50 of FIG. 7A. The Processor 50a will execute the 'Fault Interpretation Software including Spline Fault Tracking' 52 that is stored in memory 50c of the computer system of FIG. 7A; and, responsive thereto, the Processor 50a will generate an 'output display' 56 that is either recorded or displayed on the Recorder or Display device 50d of the computer system 50 of FIG. 7A. A simple example of that 'output display' 56 (which is recorded or displayed on the Recorder or Display device 50d of the computer system 50 of FIG. 7A) is illustrated in FIGS. 7B and 24.

In FIGS. 7B and 24, the 'output display' 56, associated with the recorder or display device 50d of FIG. 7A, will actually include or display a 'fault surface' 58 as shown in FIG. 7B, such as the 'fault surface' 58 shown in FIG. 24. The computer system 50 of FIG. 7A may be a personal computer (PC), a workstation, a microprocessor, or a mainframe. Examples of possible workstations include a Dell Precision notebook workstation or a Dell Dimension desktop computer or an HP Compaq Tablet PC or a Sun BLADE workstation. The memory or program storage device 50c (including the above referenced CD-ROM or DVD-ROM 54) is a 'computer readable medium' or a 'program storage device' which is readable by a machine, such as the Processor 50a. The processor 50a may be, for example, a microprocessor, microcontroller, or a mainframe or workstation processor. The memory or program storage device 50c, which stores the 'Fault Interpretation Software including Spline Fault Tracking' 52, may be, for example, a hard disk, ROM, CD-ROM, DVD-ROM, DRAM, or other RAM, flash memory, magnetic storage, optical storage, registers, or other volatile and/or non-volatile memory.

Referring to FIG. 8, a flowchart illustrates a construction and a functional operation of the 'Fault Interpretation Software including Spline Fault Tracking' 52 of FIG. 7A. Each of the steps 52a through 52i illustrated in the flowchart of FIG. 8 will be discussed again below with reference to FIGS. 9 through 24 of the drawings.

In FIG. 8, the 'Fault Interpretation Software including Spline Fault Tracking' 52 of FIG. 7A is constructed and functions in the manner illustrated in FIG. 8. In a first step 52a and 52b, start by creating a Seed Segment in a cubic volume, step 52b. In a second step 52c, project a Target Segment line from the Seed Segment and determine a Target Segment thereby creating a surface between the Seed Segment and the Target Segment, step 52c. In a third step 52d, in a first loop, it is not necessary to adjust the Target Segment; however, in a second and subsequent loop, it will be necessary to adjust the Target Segment, step 52d. In a fourth step 52e, compute criteria, step 52e. The 'compute criteria' step 52e of FIG. 8 involves the computation of a 'crosscorrelation value' for a 'volume associated with a fault plane'. The 'crosscorrelation value' for the 'volume associated with a fault plane' is denoted by the symbol 'C(A,B)', the 'crosscorrelation value' being defined by the following equation, where the following equation is more specifically defined by the equation shown in FIG. 21B, as follows:

$$C(A, B) = \frac{2 \sum_{i=1,N} A_i B_i}{\sum_{i=1,N} (A_i^2 + B_i^2)}, \text{ step } 52e.$$

In the fifth step 52f, a question is asked 'Is Best Value?'. The 'Best Value' is reached when the 'crosscorrelation value' computed during step 52e is a 'minimum crosscorrelation value', denoted by: 'Min C(A,B)'. If the 'Best Value' of step 52f is not reached (i.e., the 'crosscorrelation value' C(A,B) computed during step 52e is not a 'minimum crosscorrelation value'), after feedback loop 52g, re-adjust the Target Segment of step 52d (hereinafter referred to as the 're-adjusted Target Segment of step 52d'), and re-compute the criteria of step 52e [i.e., re-compute the 'crosscorrelation value' C(A,B) of step 52e] until the 'minimum crosscorrelation value' denoted by 'Min C(A,B)' is reached. If the 'Best Value' of step 52f is reached, a further question is asked: 'Above Threshold?', step 52i. If the most recent 'minimum crosscorrelation value' denoted by 'Min C(A,B)', corresponding to the 're-adjusted Target Segment of step 52d', is less than a 'Threshold' of step 52i, or if the end of the volume is reached, the program ends at step 52j, and the 'fault surface' 58 of FIGS. 7B and 24 has been created. However, if the most recent 'minimum crosscorrelation value' denoted by 'Min C(A,B)', corresponding to the 're-adjusted Target Segment of step 52d', is greater than (or is 'above') a 'Threshold' of step 52i, create a 'new segment', step 52h. The 'new segment' that is created by step 52h is actually the 're-adjusted Target Segment of step 52d', and repeat steps 52c, 52d, 52e, 52f, 52g, and 52i until the most recent 'minimum crosscorrelation value' denoted by 'Min C(A,B)', corresponding to the 're-adjusted Target Segment of step 52d', is less than a 'Threshold' of step 52i, or if the end of the volume is reached, wherein the program ends at step 52j and the 'fault surface' 58 of FIGS. 7B and 24 has been created.

The above description of steps 52a through 52j in FIG. 8 will be discussed in greater detail below with reference to FIGS. 9 through 24 of the drawings.

Figure 9:
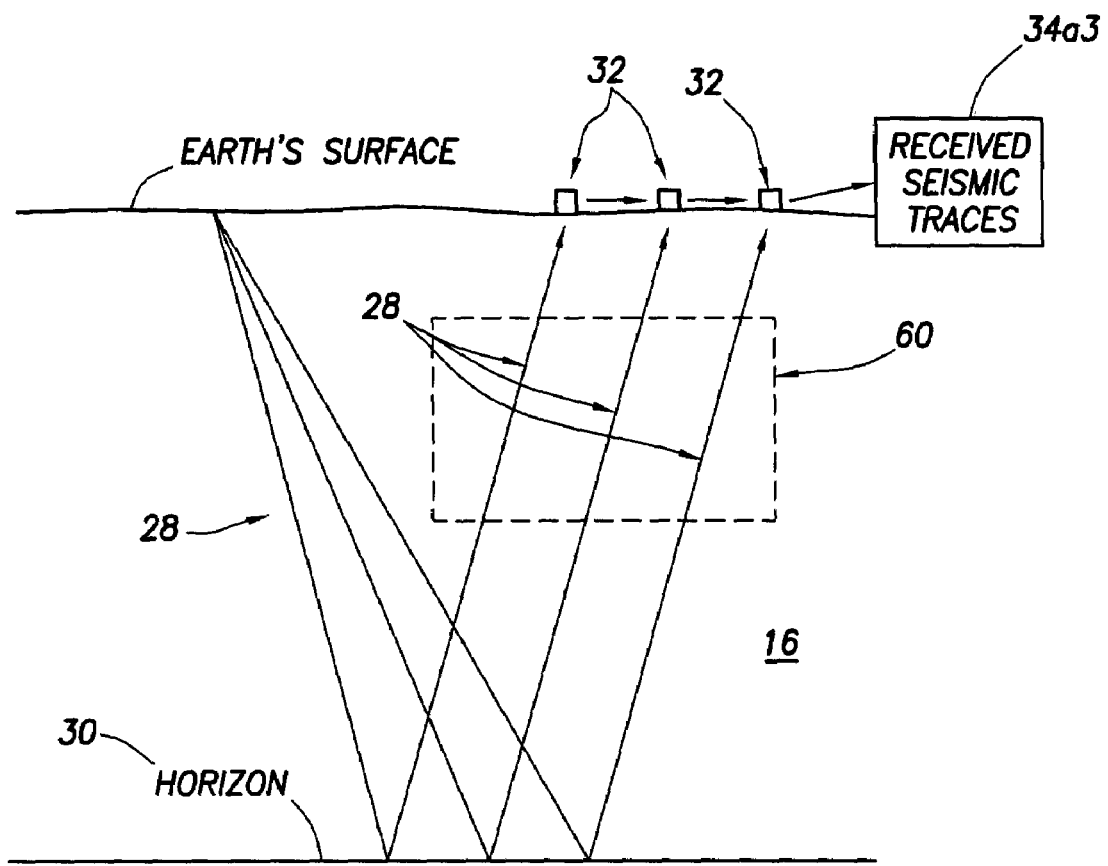

Referring to FIG. 9, as noted earlier in connection with FIG. 3, an explosive or acoustic energy source situated below the surface of the earth detonates and generates a plurality of sound or acoustic vibrations 28 which propagate downwardly and reflect off a horizon layer 30 within the Earth formation 16. In FIG. 9, the sound or acoustic vibrations 28 propagate upwardly through a 'cubic volume of Earth' 60, the acoustic vibrations 28 being received in the plurality of geophones 32 situated on the Earth's surface. In response thereto, electrical signals representative of the 'received seismic traces' 34a3 are generated, those electrical signals being received in the recording truck computer 34 of FIG. 3.

Figure 10:
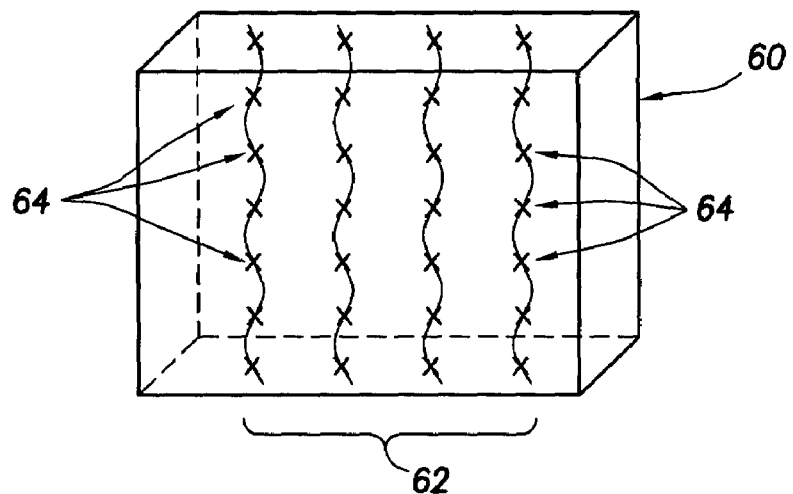

Referring to FIG. 10, the sound or acoustic vibrations 28 of FIG. 9 actually comprise a plurality of seismic traces 62 that propagate upwardly through the 'cubic volume of Earth' 60, each of the seismic traces 62 including a plurality of 'seismic data samples' 64.

Figure 11:
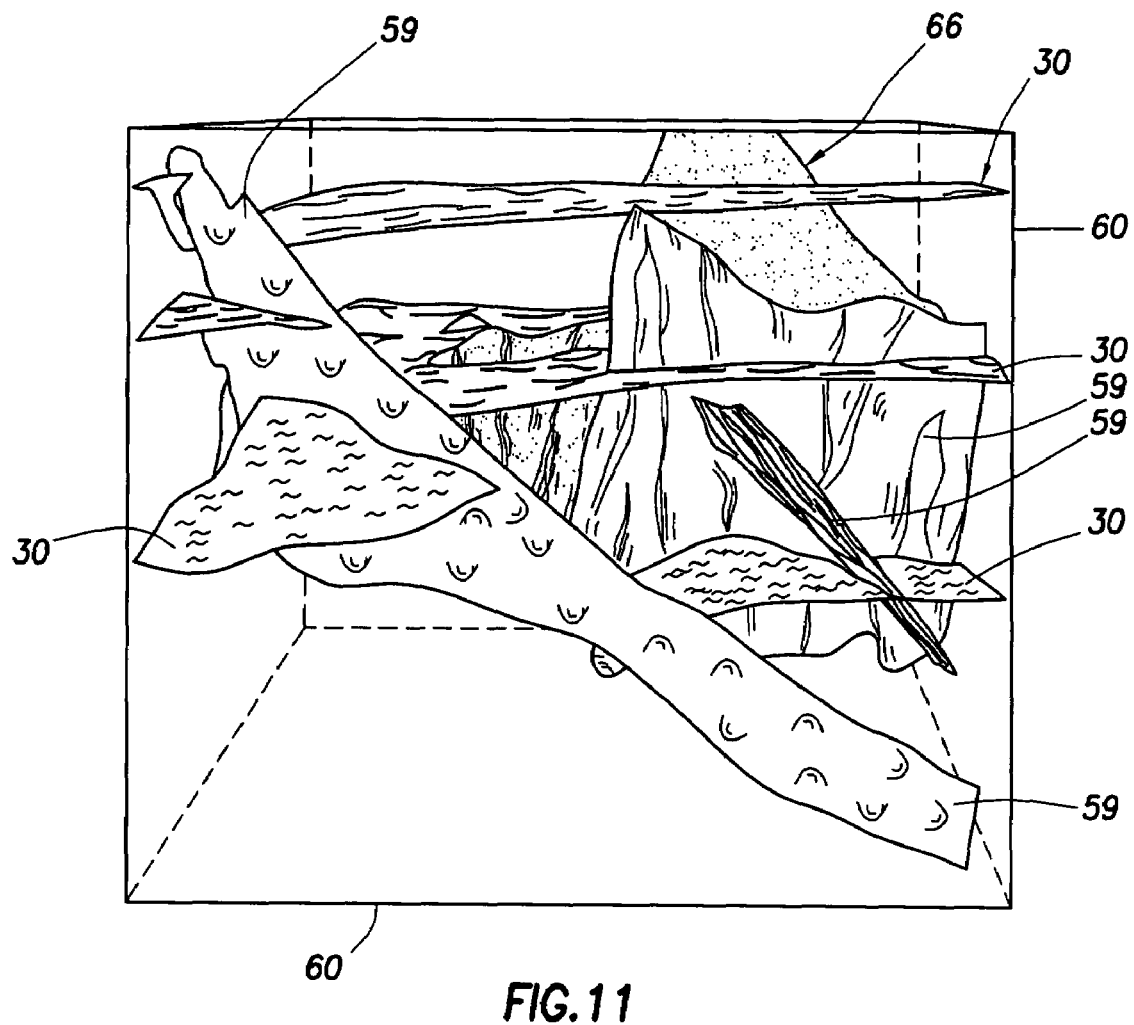
FIGS. 9 through 24 represent a series of drawings which illustrate the functional operation that is practiced by the 'Fault Interpretation Software including Spline Fault Tracking' of FIG. 7A when that software is executed by the processor of the workstation or other computer system of FIG. 7A.

Referring to FIG. 11, the 'cubic volume of Earth' 60 of FIGS. 9 and 10 is illustrated again; however, in FIG. 11, the 'cubic volume of Earth' 60 includes a plurality of horizons 30, where each horizon 30 may be intersected by one or more fault planes 59.

Figure 12:
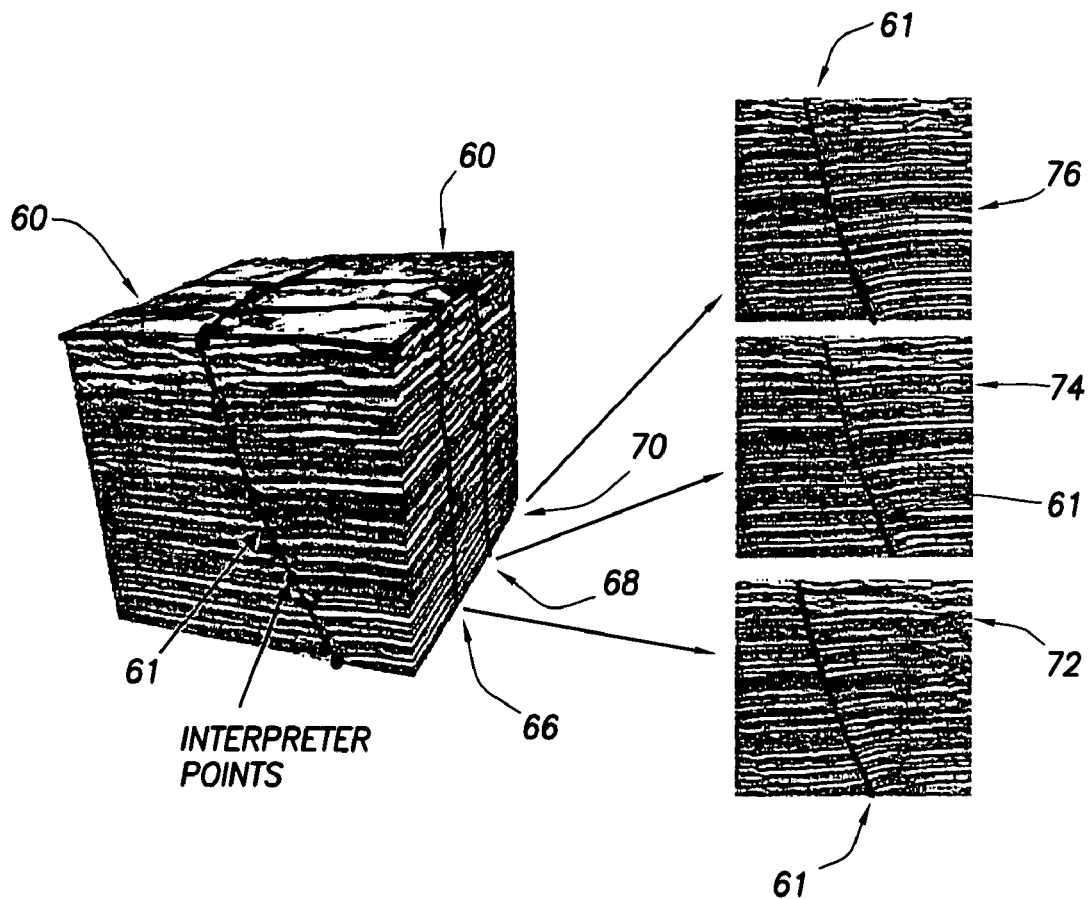

Referring to FIG. 12, the 'cubic volume of Earth' 60 is illustrated again, however, in FIG. 12, a fault plane 61 passes through the 'cubic volume of Earth' 60. Assume that three slides 66, 68, and 70 pass through the 'cubic volume of Earth' 60, where the slides 66, 68, 70 are approximately perpendicular to the fault plane 61, as shown in FIG. 12. If a first cross section along the slides 66 were taken through the 'cubic volume of Earth' 60, that first cross section can be seen in FIG. 12, numeral 72 (hereinafter, the 'first cross section' 72). Note the fault plane 61 passing through the 'first cross section' 72. Similarly, if a second cross section along the slide 68 were taken through the 'cubic volume of Earth' 60, that second cross section can be seen in FIG. 12, numeral 74 (hereinafter, the 'second cross section' 74). Note the fault plane 61 passing through the 'second cross section' 74. Similarly, if a third cross section along the slide 70 were taken through the 'cubic volume of Earth' 60, that third cross section can be seen in FIG. 12, numeral 76 (hereinafter, the 'third cross section' 76). Note the fault plane 61 passing through the 'third cross section' 76.

Figure 13:
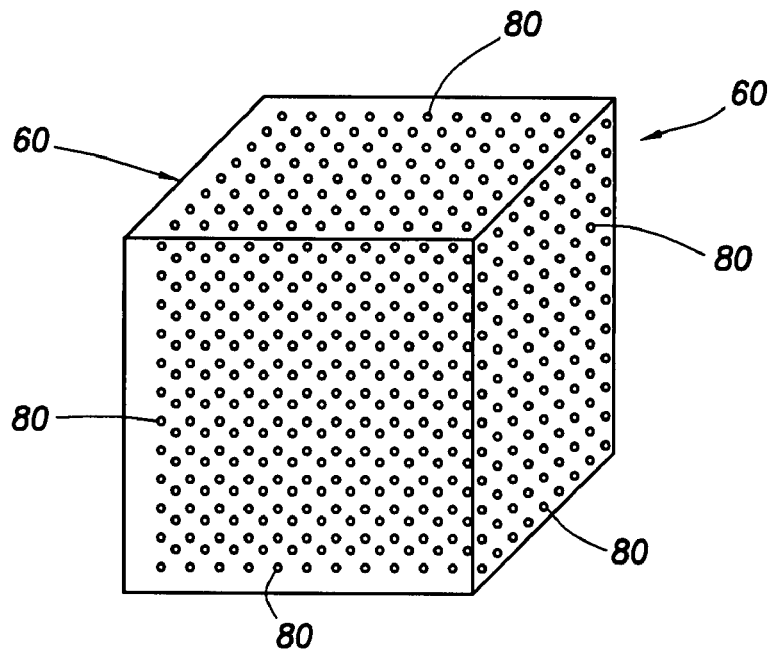

Referring to FIG. 13, the 'cubic volume of Earth' 60 is illustrated again, however, in FIG. 13, the 'cubic volume of Earth' 60 includes a multitude of voxels 80. In FIG. 13, volumetric data is shown as consisting of a three-dimensional dataset of elements called "voxels" 80. Typically, the voxels 80 are uniformly distributed throughout the 'cubic volume' 60. Each voxel 80 has a position in the volume and has associated with it information, such as color, illumination, opacity, velocity, amplitude, etc, (where the color and/or illumination and/or opacity and/or velocity and/or amplitude, etc, are hereinafter called "voxel values"). The information (i.e., the voxel values) associated with each voxel 80 is produced by such disciplines as medicine (e.g., CAT scans), biology (confocal microscopy), and geoscience (seismic data). For more information about these voxels 80, refer to U.S. Pat. No. 6,940,507 B2 to Repin et al, entitled "Method and Apparatus for Visualization of 3D Voxel Data Using Lit Opacity Volumes with Shading", the disclosure of which is incorporated by reference into the specification of this application.

Figure 14:
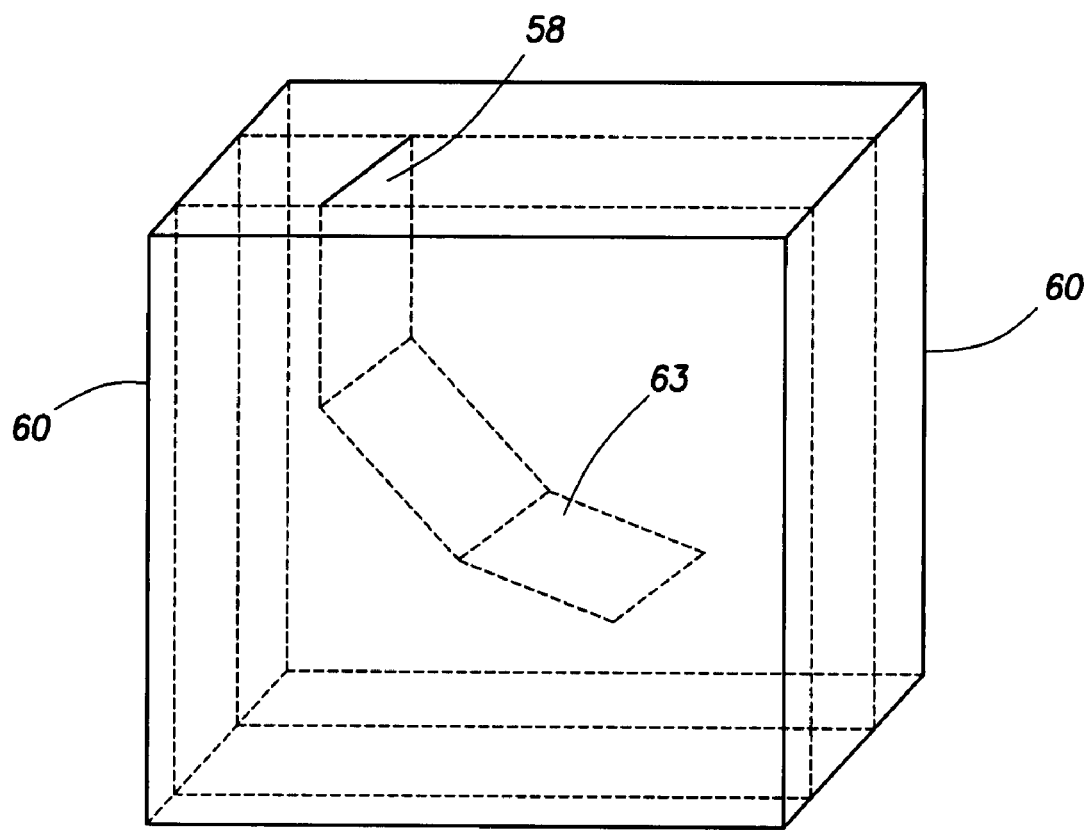

Referring to FIG. 14, the 'cubic volume of Earth' 60 is illustrated again, however, in FIG. 14, the 'cubic volume of Earth' 60 includes a fault plane 63. The fault plane 63 shown within the 'cubic volume of Earth' 60 of FIG. 14 will be utilized, during the discussion below with reference to FIGS. 15 through 24, for the purpose of describing the flowchart 52 of the 'Fault Interpretation Software including Spline Fault Tracking' 52 that is illustrated in FIG. 8.

Figure 15:
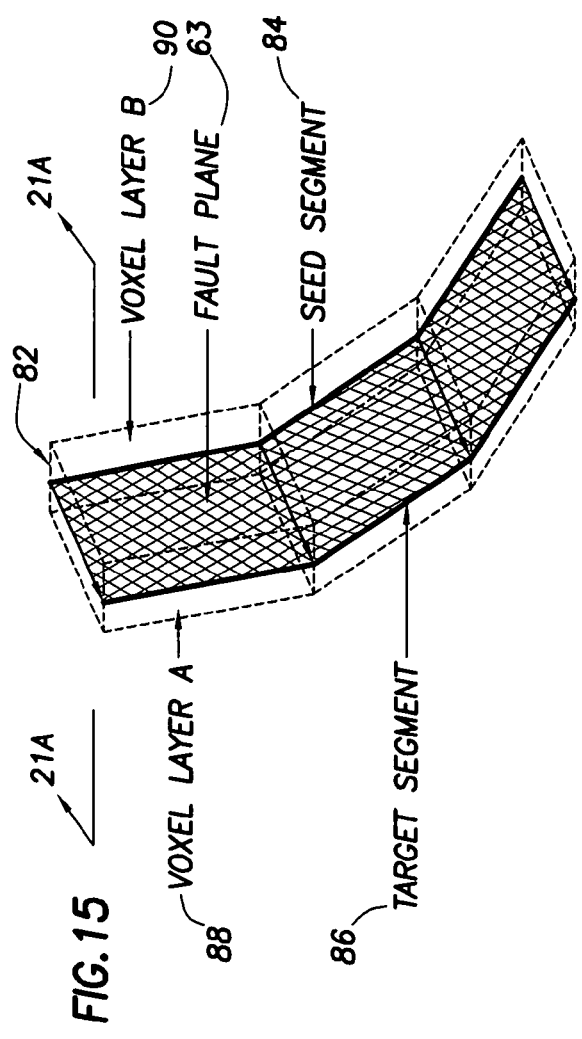

Referring to FIG. 15, a 'volume associated with a fault plane' 63 of FIG. 14 is illustrated. In FIG. 15, the fault plane 63 is actually enclosed within a volume 82, as shown in FIG. 15. The fault plane 63 includes a Seed Segment 84 and a Target Segment 86. The volume 82 which surrounds the fault plane 63 includes a voxel layer (A) 88 and a voxel layer (B) 90, the voxel layer (A) 88 extending along the 'entire length' on one side of the fault plane 63, the voxel layer (B) 90 extending along the 'entire length' on the other side of the fault plane 63. In FIG. 15, the voxel layer (A) 88 includes a plurality of 'voxel values' associated, respectively, with a corresponding plurality of voxels, such as the voxels 80 shown in FIG. 13. In addition, the voxel layer (B) 90 includes a plurality of 'voxel values' associated, respectively, with a corresponding plurality of voxels, such as the voxels 80 shown in FIG. 13.

Figure 16:
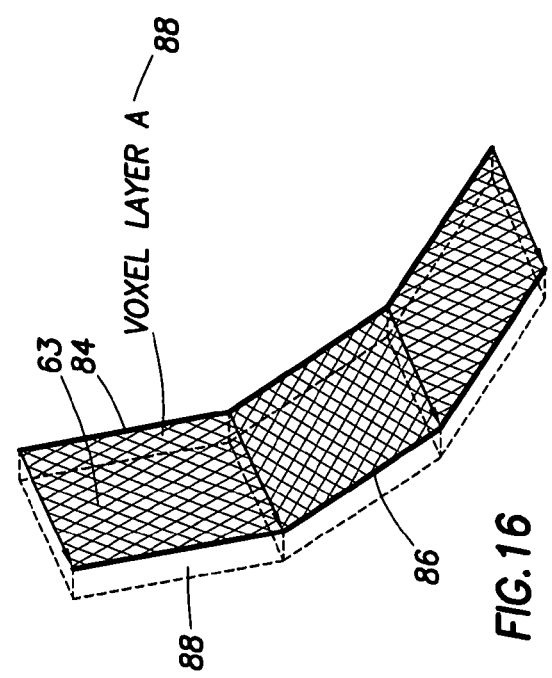

Referring to FIG. 16, the voxel layer (A) 88 of FIG. 15 is shown adjacent to one side of the fault plane 63, the voxel layer (A) 88 being a volume including a multitude of voxels which have a corresponding multitude of 'voxel values'.

Figure 17:
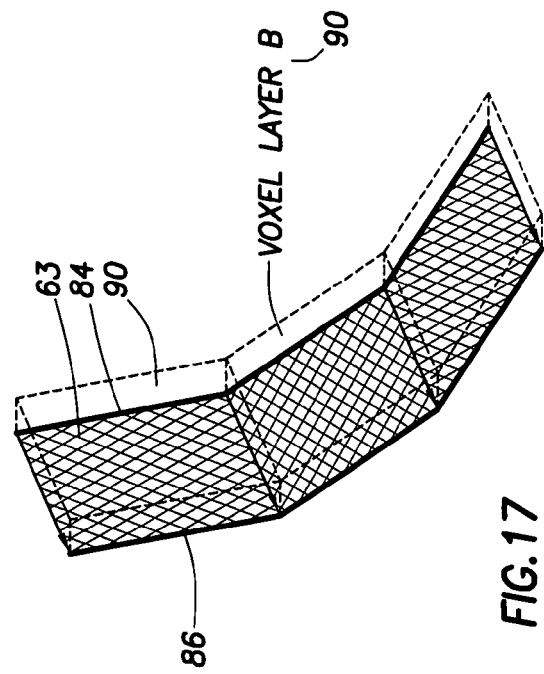

Referring to FIG. 17, the voxel layer (B) 90 of FIG. 15 is shown adjacent to the other side of the fault plane 63, the voxel layer (B) 90 being a volume including a multitude of voxels which have a corresponding multitude of 'voxel values'.

As a result, in FIGS. 15, 16, and 17, a voxel layer (A) 88 volume, including a multitude of voxels having a corresponding multitude of voxel values, is disposed on one side of the fault plane 63; and a voxel layer (B) 90 volume, including a multitude of voxels having a corresponding multitude of voxel values, is disposed on the other side of the fault plane 63.

Figure 18:
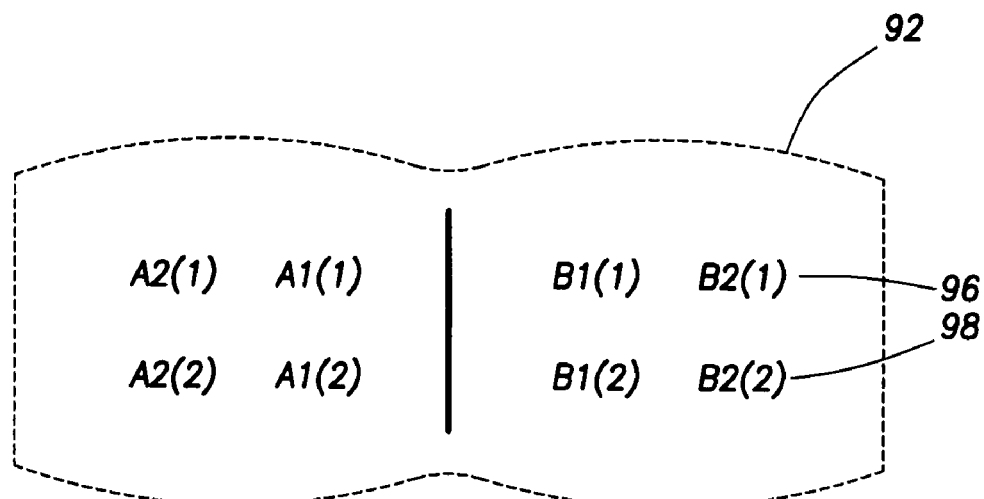

As noted below, it will be necessary to calculate a 'single crosscorrelation value' C(A,B) that will be associated specifically with the 'voxel layer (A) 88 and voxel layer (B) 90 volume' that surrounds the fault plane 63 of FIG. 15. However, in order to fully understand how to calculate the 'single crosscorrelation value' C(A,B) which is associated specifically with the 'voxel layer (A) 88 and voxel layer (B) 90 volume' of FIG. 15, consider the calculation of a crosscorrelation value C(A,B) which is associated with a two-dimensional (2D) surface that is illustrated in FIGS. 18, 19, and 20. When the calculation of the crosscorrelation value C(A,B) that is associated with a two-dimensional (2D) surface as shown in FIGS. 18-20 is understood, the calculation of a crosscorrelation value C(A,B) which is associated with the three-dimensional (3D) volume of FIGS. 21A and 21B will be further understood.

Referring to FIG. 18, consider the two-dimensional surface 92 having a first line 96 and the second line 98, where the first line 96 includes 'voxel values' A2(1), A1(1), B1(1), and B2(1), and the second line 98 includes 'voxel values' A2(2), A1(2), B1(2), and B2(2). In FIG. 18, a crosscorrelation value 'C(A,B)' corresponding to the first line 96 and the second line 98 of the two-dimensional surface 92 will be calculated below with reference to FIGS. 19 and 20.

Referring to FIGS. 19 and 20, the calculation of the crosscorrelation value C(A,B) which is associated with the first line 96 and the second line 98 of the two-dimensional surface 92 of FIG. 18 is illustrated.

In FIG. 19, the crosscorrelation value C(A,B) can be calculated by using the following equation:

$$C(A, B) = \frac{2\sum_{i=1,N} A_i B_i}{\sum_{i=1,N}(A_i^2 + B_i^2)}$$

In FIG. 20, using the equation of FIG. 19, the calculation of the crosscorrelation value C(A,B) for the first line 96 and the second line 98 of the two-dimensional surface 92 of FIG. 18 will be discussed below. In FIG. 20, considering the first line 96 and the second line 98 of FIG. 18 and using the equation of FIG. 19, the crosscorrelation value C(A,B) for the first line 96 and the second line 98 of the two-dimensional surface 92 of FIG. 18 can be calculated as follows:

$$C(A, B) = \frac{2[A1(1)B1(1) + A2(1)B2(1) + A1(2)B1(2) + A2(2)B2(2)]}{[A1(1)^2 + A1(2)^2 + A2(1)^2 + A2(2)^2 + B1(1)^2 + B1(2)^2 + B2(1)^2 + B2(2)^2]}$$

Figure 21A:
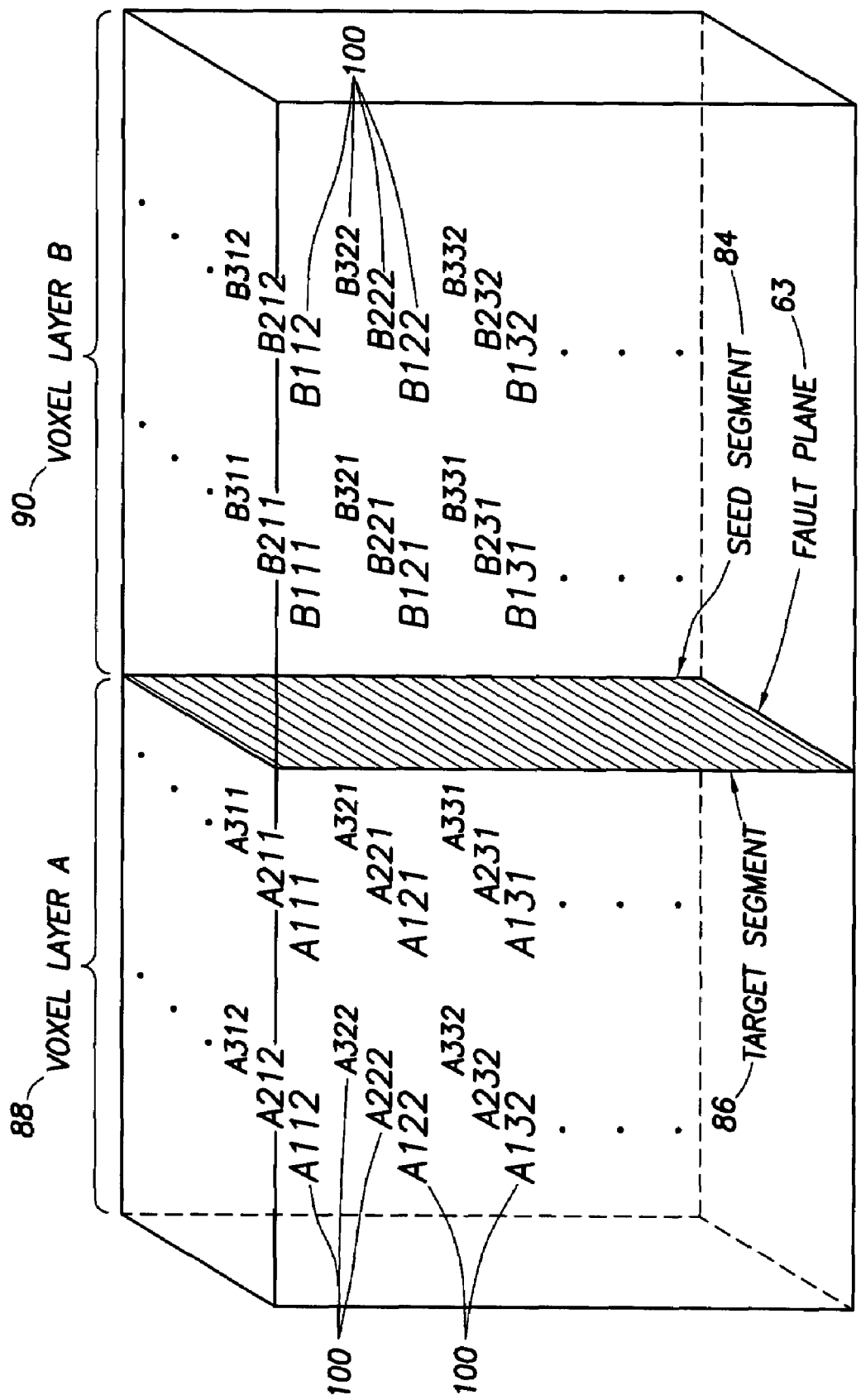
Figures 21B, 25:
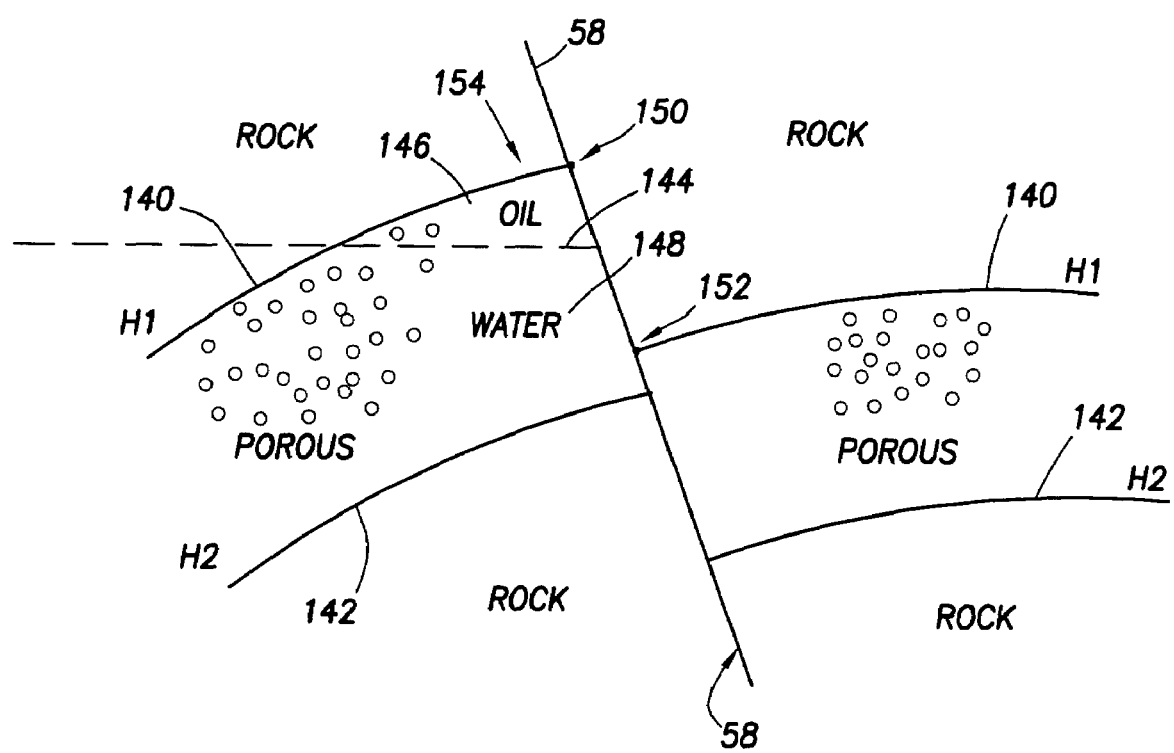
FIG. 25 illustrates two horizons separated by a fault surface wherein oil is stored at a 'particular location' in the Earth formation, the 'particular location' being located an intersection between a horizon and the fault surface in the Earth formation.

Referring to FIGS. 21A and 21B, the calculation of a crosscorrelation value C(A,B) that is specifically associated with a three-dimensional (3D) volume is illustrated in FIGS. 21A and 21B. In FIG. 21A, the volume shown in FIG. 21A represents a 'particular cross section' of the 'voxel layer (A) 88 and voxel layer (B) 90 volume' of FIG. 15, where the 'particular cross section' is taken along section lines 21A-21A of FIG. 15.

In FIG. 21A, utilizing the knowledge gained above with reference to FIGS. 18, 19, and 20, where a crosscorrelation value C(A,B) associated with a two-dimensional (2D) surface was calculated, in FIG. 21A, a three-dimensional (3D) Volume is illustrated, the 3D Volume including voxel layer (A) 88 and voxel layer (B) 90 that is separated by the fault plane 63. In FIG. 21A, the three-dimensional (3D) Volume includes a multitude of voxels 100 having a respective multitude of 'voxel values' 100, where the 'voxel values' 100 include such values as: A132, A232, A332, . . . , and B132, B232, B332, etc, as shown in FIG. 21A.

In FIG. 21B, it is necessary to calculate a 'crosscorrelation value' C(A,B) which is specifically associated with the three-dimensional (3D) Volume that is shown in FIG. 21A. FIG. 21B illustrates an equation which is utilized for calculating the 'crosscorrelation value' C(A,B) which is specifically associated with the three-dimensional (3D) Volume that is shown in FIG. 21A. Recalling the discussion of the calculation of the 'crosscorrelation value' C(A,B) for a 2D surface set forth above with reference to FIGS. 18, 19, and 20, in FIG. 21B, the equation that is adapted for calculating the 'crosscorrelation value' C(A,B) which is specifically associated with the three-dimensional (3D) Volume shown in FIG. 21A is duplicated below, as follows:

$$C(A, B) = \frac{2\sum_{i,j,k}(A_{ijk} * B_{ijk})}{\sum_{i,j,k}(A_{ijk}^2 + B_{ijk}^2)}$$

The discussion set forth above dealt with calculating a crosscorrelation value C(A,B) that is specifically associated with a three-dimensional (3D) Volume, such as the volume illustrated in FIG. 21A utilizing the equation illustrated in FIG. 21B. The thickness of the voxel layers, which is the value range of the k index, is user defined. Now that we know how to calculate a crosscorrelation value C(A,B) that is specifically associated with a three-dimensional (3D) Volume, let us now utilize that knowledge to determine a fault surface, such as the fault surface 58 shown in FIG. 7B.

Figure 22:
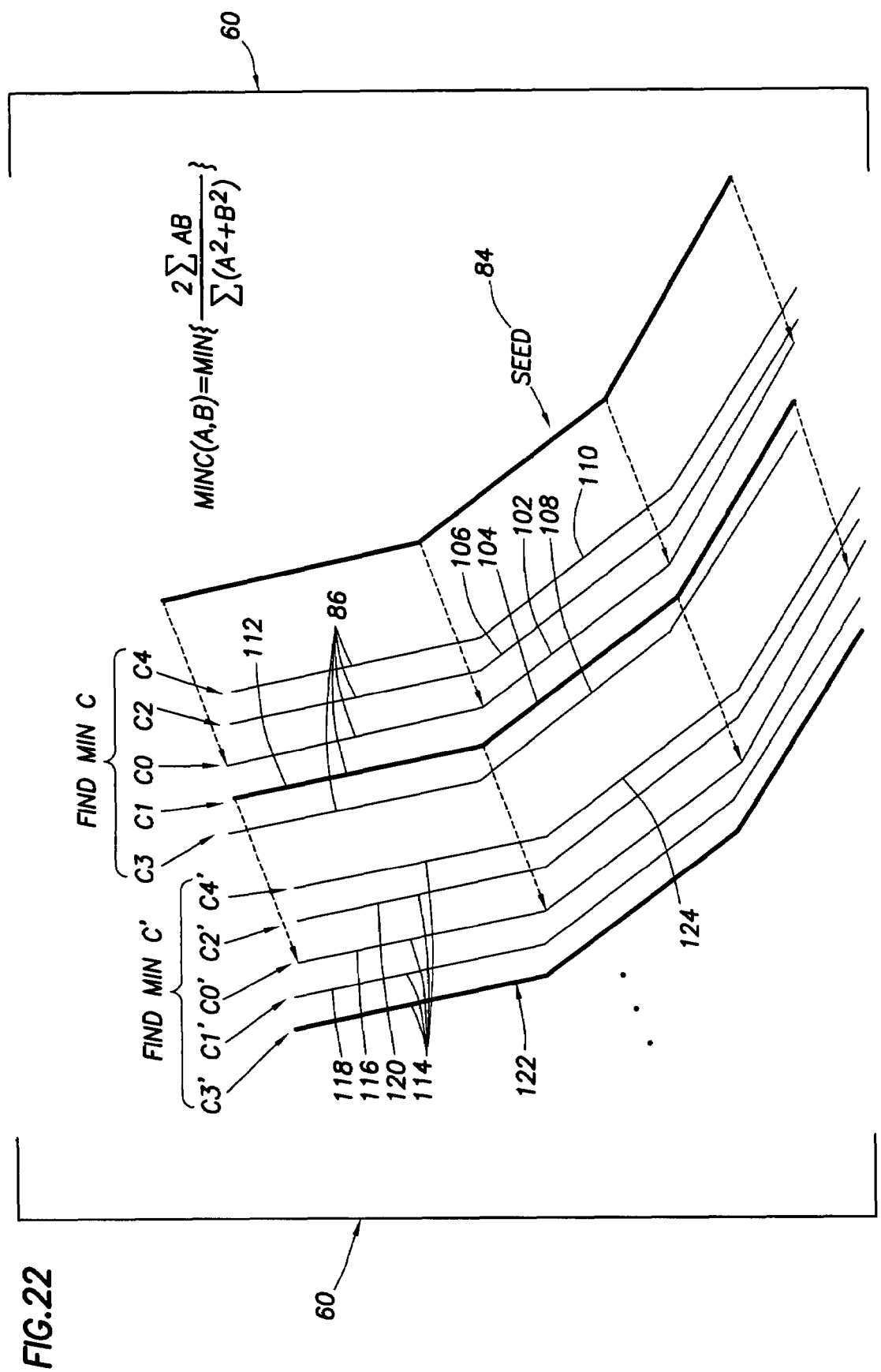
Figure 23:
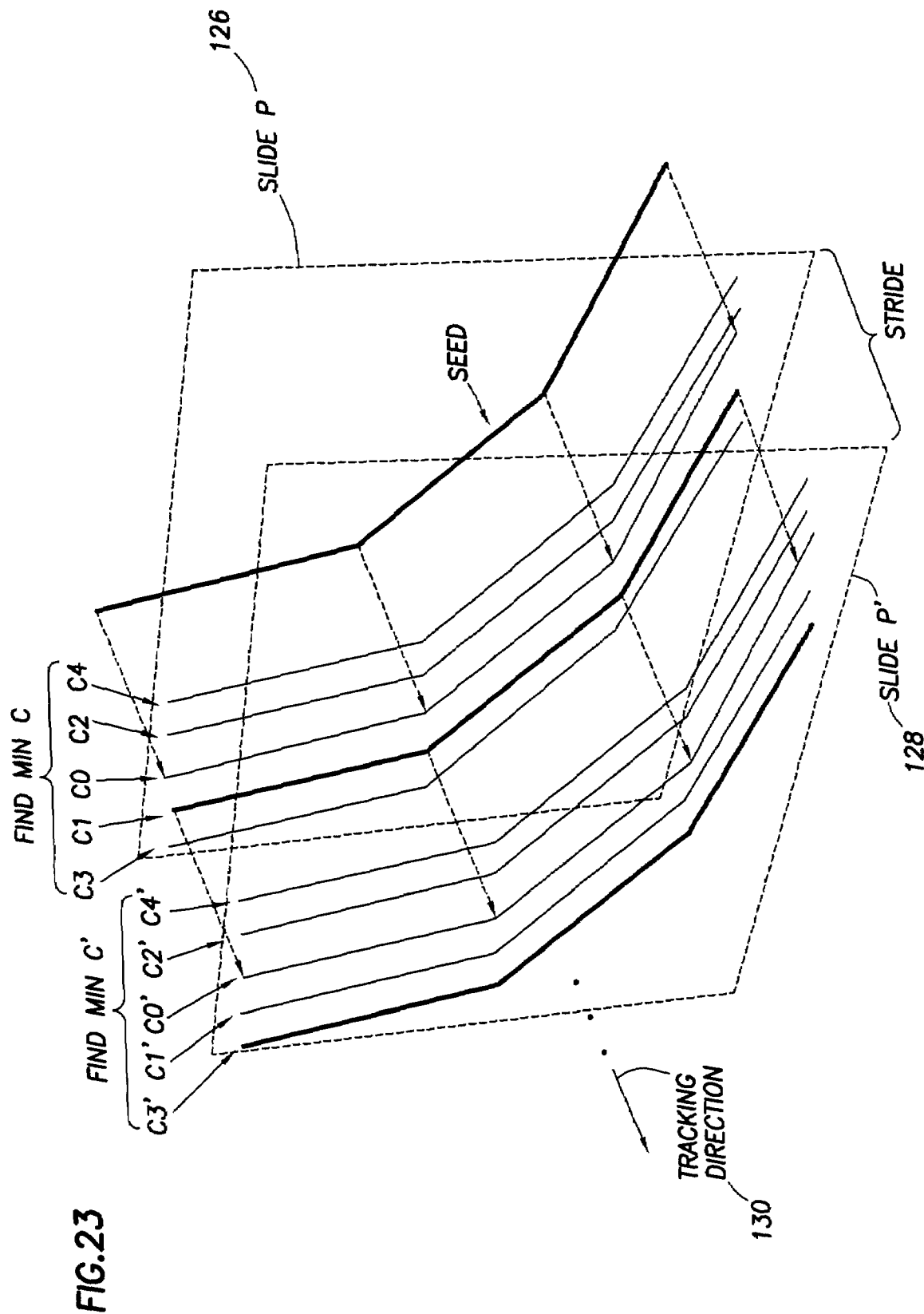

Referring to FIGS. 22 and 23, 'tracking' is utilized in order to determine how a fault plane intersects with a series of vertical 'volume slides'. These vertical 'volume slides' are evenly spaced and they are all parallel to the seed segment. The distance between the 'volume slides' (that is, the 'stride') is user configurable. The 'volume slides' also function as 'target slides'. The goal here is to derive one 'fault segment' (known as a 'derived fault segment') on each of the target slides. At the end, the seed segment plus all of the 'derived fault segments' will jointly define the fault surface 58. Note that the target slides (126, 128, . . . ) in FIG. 23 are pre-existing. They are not the result of tracking. The distance between slides 126 and 128 is called the 'stride', and the 'tracking direction' in FIG. 23 is denoted by element numeral 130 in FIG. 23.

In FIGS. 22 and 23, referring initially to FIG. 23, the 'Tracking' sequence is: stride by stride. For the first stride, the seed segment 84 is perpendicularly projected to the next target slide, at 126. The projection of 84 onto 126 is the target segment 102 in FIG. 22. The target segment 102 in FIG. 22 then undergoes a series of 'adjustments within the slide 126' in order to search for the best criteria. In connection with the 'adjustments within the slide 126', a series of 'horizontal shifting' is used as an example of the adjustment; 'rotation', or any other type of reshaping or repositioning, or any combination of different types of adjustments, can also be used. In practice, horizontal shifting followed by rotation is very effective. The exact number and types of adjustments to apply within the volume slide is defined by users. In FIG. 22, Target segment 102 is horizontally shifted, within the slide 126 of FIG. 23, to the left (see 104, 108 in FIG. 22), and to the right (see 106, 110 in FIG. 22). Each of the target segments (102, 104, 108, 106, 110) has a corresponding crosscorrelation value computed (i.e., C0, C1, C2, C3, C4). The target segment with the minimum crosscorrelation value is selected as the 'derived fault segment' on this target slide. Assuming that C1 is the minimum, Target segment 104 is the selected as the 'derived fault segment' on slide 126. Target segment 104 is then used to propagate further on, and the above referenced process repeats in connection with slide 128 in FIG. 23, which is the next target volume slide. Note that the seed segment 84 of FIG. 22 is projected to slide 126 in FIG. 23 'just once' in order to generate the initial target segment 102. Other target segments (104, 108, 106, 110) on volume slide 126 are produced by 'adjusting the target segment 102' in FIG. 22.

In FIGS. 22 and 23, recalling the 'create Seed Segment' step 52b, the 'Project Target' step 52c, the 'Adjust Target' step 52d, the 'compute criteria' step 52e, the 'Is Best Value' step 52f, and the feedback loop step 52g and the loop step 52h of the flowchart of FIG. 8, a Seed Segment 84 is shown disposed within the 'cubic volume of Earth' 60 shown in FIG. 14. The fault surface 58 of FIGS. 7B and 24 will now be determined. In FIGS. 22 and 23, considering the 'Project Target' step 52c, the 'Adjust Target' step 52d, the 'compute criteria' step 52e, the 'Is Best Value' step 52f, the feedback loop 52g including a repeat of steps 52d, 52e, and 52f, the loop step 52h, and the 'Above Threshold' step 52i associated with the flowchart 52 of FIG. 8, perform the following steps while referring to FIGS. 22 and 23, as follows:

(1) In FIGS. 22 and 23, perpendicularly project seed segment 84 onto slide 126. The projected segment is 102. Calculate a 'first crosscorrelation value (C0) for a 3D Volume' between 84 and 102 [representing C(A,B)] in the manner discussed above with reference to FIGS. 21A and 21B;

(2) In FIGS. 22 and 23, within volume slide 126, adjust 102 by horizontally shifting it to the left to get 104 and then calculate a 'second crosscorrelation value (C1) for a 3D Volume' between 84 and 104 [representing C(A,B)] in the manner discussed above with reference to FIGS. 21A and 21B;

(3) In FIGS. 22 and 23, within volume slide 126, adjust 102 by horizontally shifting it to the right to get 106 and then calculate a 'third crosscorrelation value (C2) for a 3D Volume' between 84 and 106 [representing C(A,B)] in the manner discussed above with reference to FIGS. 21A and 21B;

(4) In FIGS. 22 and 23, within volume slide 126, adjust 102 by horizontally shifting it further to the left to get 108 and then calculate a 'fourth crosscorrelation value (C3) for a 3D Volume' between 84 and 108 [representing C(A,B)] in the manner discussed above with reference to FIGS. 21A and 21B;

(5) In FIGS. 22 and 23, within volume slide 126, adjust 102 by horizontally shifting it further to the right to get 110 and then calculate a 'fifth crosscorrelation value (C4) for a 3D Volume' between 84 and 110 [representing C(A,B)] in the manner discussed above with reference to FIGS. 21A and 21B;

(6) In FIGS. 22 and 23, determine the 'minimum one of (C0), (C1), (C2), (C3), and (C4)' which would represent a 'minimum crosscorrelation value' [Min C(A,B)]; and assume, for purposes of this discussion, that the 'minimum one of (C0), (C1), (C2), (C3), and (C4)' would be (C1), which corresponds target segment 104. As a result, target segment 104 is chosen as the derived fault segment on slide 126. As the intersection of fault surface 58 and volume slide 126, segment 104 lies within the fault surface 58 of FIGS. 7B and 24. Up to this point, the first stride of the tracking process has been finished.

Since segment 104 having the crosscorrelation value (C1) represents the 'minimum one of (C0), (C1), (C2), (C3), and (C4)', segment 104 will now be designated as first derived fault segment 112 for purposes of the following discussion.

In FIGS. 22 and 23, considering the 'Project Target' step 52*c*, the 'Adjust Target' step 52*d*, the 'compute criteria' step 52*e*, the 'Is Best Value' step 52*f*, the feedback loop 52*g* including a repeat of steps 52*d*, 52*e*, and 52*f*, the loop step 52*h*, and the 'Above Threshold' step 52*i* associated with the flowchart 52 of FIG. 8, perform the following steps while referring to FIGS. 22 and 23, as follows:

(1) In FIGS. 22 and 23, perpendicularly project derived fault segment 112 onto volume slide 128. The projected segment is 116. Calculate a 'sixth crosscorrelation value (C0') for a 3D Volume' between 112 and 116 [representing C(A,B)] in the manner discussed above with reference to FIGS. 21A and 21B;

(2) In FIGS. 22 and 23, within volume slide 128, adjust 116 by horizontally shifting it to the left to get 118. Calculate a 'seventh crosscorrelation value (C1') for a 3D Volume' between 112 and 118 [representing C(A,B)] in the manner discussed above with reference to FIGS. 21A and 21B;

(3) In FIGS. 22 and 23, within volume slide 128, adjust 116 by horizontally shifting it to the right to get 120. Calculate a 'eighth crosscorrelation value (C2') for a 3D Volume' between 112 and 120 [representing C(A,B)] in the manner discussed above with reference to FIGS. 21A and 21B;

(4) In FIGS. 22 and 23, within volume slide 128, adjust 116 by horizontally shifting it further to the left to get 122. Calculate a 'ninth crosscorrelation value (C3') for a 3D Volume' between 112 and 122 [representing C(A,B)] in the manner discussed above with reference to FIGS. 21A and 21B;

(5) In FIGS. 22 and 23, within volume slide 128, adjust 116 by horizontally shifting it further to the right to get 124. Calculate a 'tenth crosscorrelation value (C4') for a 3D Volume' between 112 and 124 [representing C(A,B)] in the manner discussed above with reference to FIGS. 21A and 21B;

(6) In FIGS. 22 and 23, determine the 'minimum one of (C0'), (C1'), (C2'), (C3'), and (C4')' which would represent a 'minimum crosscorrelation value' [Min C(A,B)]; and assume, for purposes of this discussion, that the 'minimum one of (C0'), (C1'), (C2'), (C3'), and (C4')' would be (C3'), which corresponds target segment 122. As a result, target segment 122 is chosen as the derived fault segment on slide 128. As the intersection of fault surface 58 and volume slide 128, segment 122 lies within the fault surface 58 of FIGS. 7B and 24. Up to this point, the second stride of the tracking process has been finished.

Since segment 122 having the crosscorrelation value (C3') represents the 'minimum one of (C0'), (C1'), (C2'), (C3'), and (C4')', segment 122 will now be designated as second derived fault segment for subsequent processing, the subsequent processing repeating steps (1) through (6) in the manner discussed above with reference to FIGS. 22 and 23. Recalling the 'Above Threshold?' step 52*i* of the flowchart 52 of FIG. 8, in FIGS. 22 and 23, if (C3'), which represents the 'minimum one of (C0'), (C1'), (C2'), (C3'), and (C4')', is not above a threshold value, or if the end of the volume is reached, then, the processing or execution of the flowchart 52 by processor 50*a* of FIG. 7A will end with the 'end' step 52*j* in FIG. 8.

In FIGS. 22 and 23, recall from the above discussion that derived fault segment 104 lies within the fault surface 58 of FIGS. 7B and 24, and derived fault segment 122 also lies within the fault surface 58 of FIGS. 7B and 24.

The above discussion in connection with FIGS. 22 and 23 uses 'crosscorrelation' as the criteria. If the tracking is on a 'coherence volume', the above process is the same except that the criteria should be the 'average coherence value on the plane'.

The above discussion in connection with FIGS. 22 and 23 describes the situation when there is only one seed segment (84) to start the tracking process. In fact, multiple seed segments can be used for Spline Fault Tracking. All the seed segments must reside on volume slides that are parallel to each other. Tracking direction is perpendicular to those volume slides on which the seed segments reside. When tracking in between seed segments, instead of perpendicularly projecting the seed onto the target volume slide as in the single seed situation, the initial target segment on a target volume slide is generated by linearly interpolating the two adjacent seed segments. The initial target segment then undergoes a series of adjustments within the target volume slide to search for best criteria. Tracking in between seed segments is more accurate than tracking from single seed segment.

Based on the Spline Fault Tracking process as described above, a track-and-edit fault interpretation workflow can be developed to seamlessly combine automation with manual guidance and intervention. Interpreters can manually edit on any of the derived fault segments if necessary and perform SFT multiple times to progressively refine tracking result. Take FIGS. 22 and 23 for example, as described above, seed segment 84 is used to track the volume to get a series of derived fault segments (104, 122 . . . ). The interpreter might decide to manually adjust derived fault segment 122 to better fit to the changing fault pattern. After manually adjusting derived fault segment 122, the interpreter can again perform SFT. This time, the manually adjusted segment 122 is used as addition seed segment. Just like seed segment 84, the second seed segment 122 will be used to derive other fault segments but itself will not be altered in subsequent tracking. During the second tracking, the first target segment on volume slide 126 is created by linearly interpolating seed segment 84 and seed segment 122 (manually adjusted). Thus created target segment then undergoes a series of adjustments within volume slide 126 in search for the best criteria. The more manual adjustments the interpreter makes, the more seed segments are generated to better guide and constrain the tracking, and the more accurate is the tracking result.

Referring to FIG. 24, the fault surface 58 of FIG. 7B is illustrated again. However, since the above discussion with reference to FIGS. 22 and 23 has determined that the derived fault segment 104 lies within the fault surface 58 and derived fault segment 122 also lies within the fault surface 58, in FIG. 24, the fault surface 58 must therefore include derived fault segment 104 and derived fault segment 122, as illustrated in FIG. 24.

Referring to FIG. 25, recalling that the 'fault surface' 58 of FIG. 24 has been defined by the 'Fault Interpretation Software including Spline Fault Tracking' 52 of FIG. 8, that 'fault surface' 58 is shown again in FIG. 25. A first horizon (H1) 140 and a second horizon (H2) 142 are intersected by the 'fault surface' 58. Now that the 'fault surface' 58 has been defined, it is necessary to interpret the well log output record 22 and the reduced seismic data output record 46 of FIG. 6 to define the precise location of the 'underground deposits of hydrocarbon' in an Earth formation. For example, in FIG. 25, the 'fault surface' 58 cuts through the first horizon 140 and the second horizon 142 in the Earth formation. A line 144 represents a separation between oil 146 and water 148, the oil 146 and water 148 existing on one side of the 'fault surface' 58. Rock and porous material exists on the other side of the 'fault surface' 58. The 'fault surface' 58 intersects the horizons (H1) 140 and (H2) 142 at two places, a first intersection 150 and a second intersection 152. From FIG. 25, it is evident that oil 146 usually exists near the intersections 150 and 152 between the 'fault surface' 58 and the horizons (H1) 140 and (H2) 142. In order to extract the oil 146 from the Earth formation, it is necessary to drill near the first intersection 150 at point 154. However, in order to know the exact location of point 154, one must first define the 'fault surface' 58, and the 'fault surface' 58 has already been defined by the 'Fault Interpretation Software including Spline Fault Tracking' 52 of FIG. 8 in the manner discussed above with reference to FIGS. 9 through 24 of the drawings.

Figure 26:
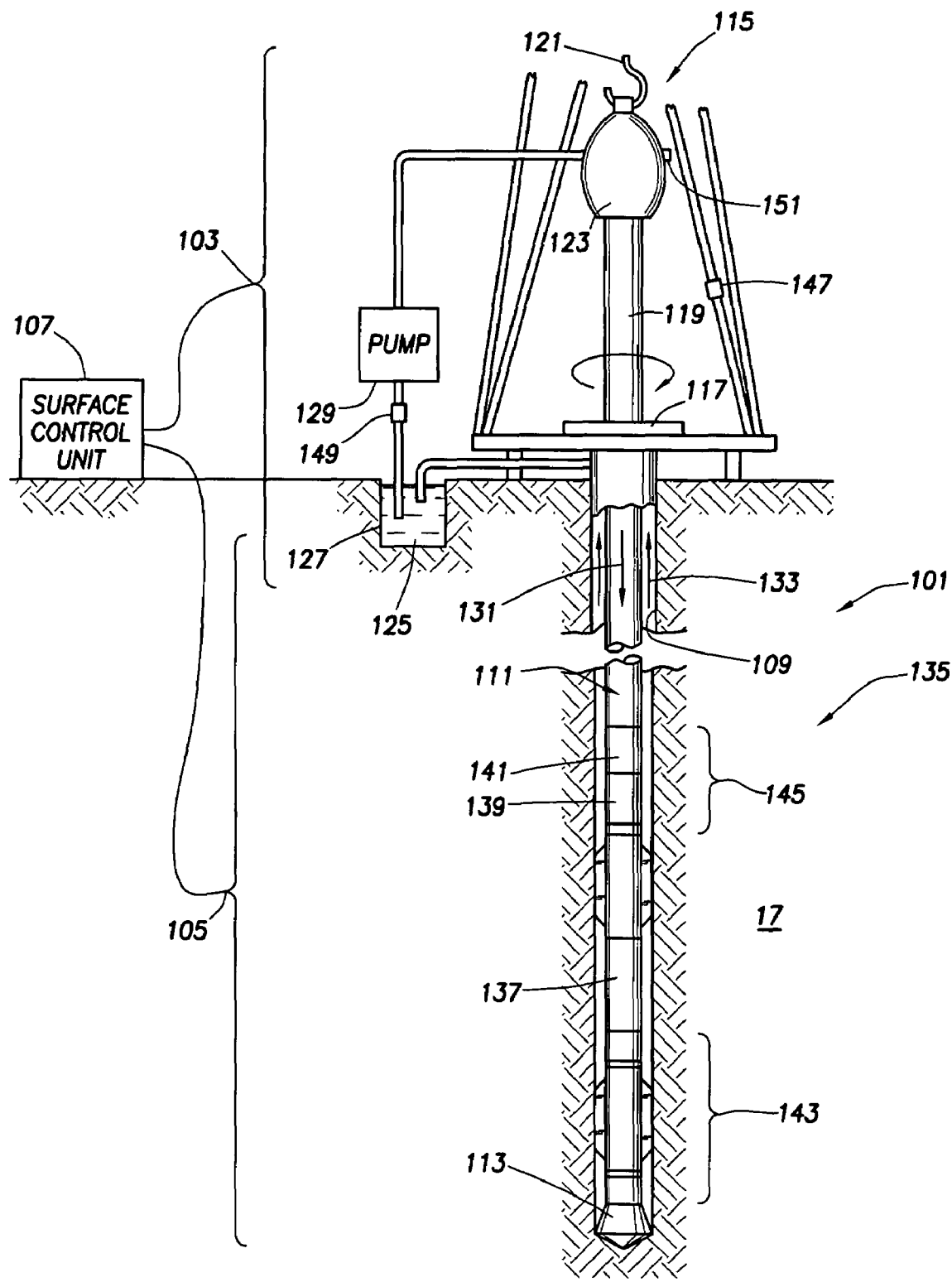
FIG. 26 illustrates a drilling rig that is situated on the Earth's surface and above the 'particular location' in the Earth formation for the purpose of withdrawing the oil from the Earth formation.

Referring to FIG. 26, recalling from FIG. 25 that it would be necessary to drill near the first intersection 150 at point 154 in order to extract the oil 146 from the Earth formation, a drilling rig can be placed on the Earth's surface directly above the point 154 of FIG. 25 for the purpose of extracting the oil 146 from the Earth formation.

In FIG. 26, an example of that drilling rig 101 is illustrated. The drilling rig 101 is situated above a 'particular location' in the Earth formation 16 (that is, above the point 154 in the Earth's formation of FIG. 25) where the oil and/or gas is potentially located. In FIG. 26, one embodiment of the drilling rig 101 includes a surface system 103, a downhole system 105, and a surface control unit 107. In the illustrated embodiment, a borehole 109 is formed by rotary drilling in a manner that is well known. Those of ordinary skill in the art given the benefit of this disclosure will appreciate, however, that the present invention also finds application in drilling applications other than conventional rotary drilling (e.g., mud-motor based directional drilling), and is not limited to land-based rigs. The downhole system 105 includes a drill string 111 suspended within the borehole 109 with a drill bit 113 at its lower end. The surface system 103 includes the land-based platform and derrick assembly 115 positioned over the borehole 109 penetrating a subsurface formation 17. The assembly 115 includes a rotary table 117, kelly 119, hook 121, and rotary swivel 123. The drill string 111 is rotated by the rotary table 117, energized by means not shown, which engages the kelly 119 at the upper end of the drill string. The drill string 111 is suspended from a hook 121, attached to a traveling block (also not shown), through the kelly 119 and a rotary swivel 123 which permits rotation of the drill string relative to the hook. The surface system further includes drilling fluid or mud 125 stored in a pit 127 formed at the well site. A pump 129 delivers the drilling fluid 125 to the interior of the drill string 111 via a port in the swivel 123, inducing the drilling fluid to flow downwardly through the drill string 111 as indicated by the directional arrow 131. The drilling fluid exits the drill string 111 via ports in the drill bit 113, and then circulates upwardly through the region between the outside of the drill string and the wall of the borehole, called the annulus, as indicated by the directional arrows 133. In this manner, the drilling fluid lubricates the drill bit 113 and carries formation cuttings up to the surface as it is returned to the pit 127 for recirculation. The drill string 111 further includes a bottom hole assembly (BHA), generally referred to as 135, near the drill bit 113 (in other words, within several drill collar lengths from the drill bit). The bottom hole assembly includes capabilities for measuring, processing, and storing information, as well as communicating with the surface. The BHA 135 further includes drill collars 137, 139, and 141 for performing various other measurement functions. Drill collar 137 of BHA 135 includes an apparatus 143 for determining and communicating one or more properties of the formation 17 surrounding borehole 109, such as formation resistivity (or conductivity), natural radiation, density (gamma ray or neutron), and pore pressure. Drill collar 139 houses a measurement-while-drilling (MWD) tool. The MWD tool further includes an apparatus for generating electrical power to the downhole system. While a mud pulse system is depicted with a generator powered by the flow of the drilling fluid 125 that flows through the drill string 111 and the MWD drill collar 141, other power and/or battery systems may be employed. Sensors are located about the wellsite to collect data, preferably in real time, concerning the operation of the wellsite, as well as conditions at the wellsite. For example, monitors, such as cameras 147, may be provided to provide pictures of the operation. Surface sensors or gauges 149 are disposed about the surface systems to provide information about the surface unit, such as standpipe pressure, hookload, depth, surface torque, rotary rpm, among others. Downhole sensors or gauges 151 are disposed about the drilling tool and/or wellbore to provide information about downhole conditions, such as wellbore pressure, weight on bit, torque on bit, direction, inclination, collar rpm, tool temperature, annular temperature and toolface, among others. The information collected by the sensors and cameras is conveyed to the surface system, the downhole system and/or the surface control unit. The MWD tool 141 includes a communication subassembly 145 that communicates with the surface system. The communication subassembly 145 is adapted to send signals to and receive signals from the surface using mud pulse telemetry. The communication subassembly may include, for example, a transmitter that generates a signal, such as an acoustic or electromagnetic signal, which is representative of the measured drilling parameters. The generated signal is received at the surface by transducers, represented by reference numeral 151, that convert the received acoustical signals to electronic signals for further processing, storage, encryption and use according to conventional methods and systems. Communication between the downhole and surface systems is depicted as being mud pulse telemetry, such as the one described in U.S. Pat. No. 5,517,464, assigned to the assignee of the present invention. It will be appreciated by one of skill in the art that a variety of telemetry systems may be employed, such as wired drill pipe, electromagnetic or other known telemetry systems.

A description of the structure and functional operation of the 'Fault Interpretation Software including Spline Fault Tracking' 52 of FIGS. 7A and 8, used for the purpose of producing underground deposits of hydrocarbon from an Earth formation, such as oil and gas, will be set forth in the following paragraphs with reference to FIGS. 1 through 26 of the drawings.

A computer system 50 responds to the well log output record 22 and the reduced seismic data output record 46 of FIG. 7A and executes a 'Fault Interpretation Software including Spline Fault Tracking' 52. In response to the execution, by processor 50a, of the 'Fault Interpretation Software including Spline Fault Tracking' 52, a fault surface 58 is determined by the processor 50a, and a recorder or display device 50d will record or display, on an output display 56, the previously determined fault surface 58 that is disposed within an Earth formation 16. When the fault surface 58 is determined, since underground deposits of hydrocarbon, such as oil and gas, may reside at a particular location near the fault surface 58, a drilling rig 101 of FIG. 26 may be placed directly above the particular location for producing the underground deposits of hydrocarbon from an Earth formation 16. The 'Fault Interpretation Software including Spline Fault Tracking' 52 will determine and generate the fault surface 58 of FIGS. 7B and 24 by performing the following steps. The 'Fault Interpretation Software including Spline Fault Tracking' 52 will determine a first plurality of 'crosscorrelation values C0, C1, C2, C3, C4 for a 3D Volume' (in the manner described above with reference to FIGS. 21A and 21B) associated, respectively, with a corresponding 'first plurality of 3D Volumes' (as discussed above with reference to FIGS. 22 and 23). A 'first minimum one' of the 'crosscorrelation values C0, C1, C2, C3, C4 for a 3D Volume' is selected. The 'first Derived Fault Segment' corresponding to that 'first minimum one' of the 'crosscorrelation values C0, C1, C2, C3, C4 for a 3D Volume' lies on the fault surface 58. The 'Fault Interpretation Software including Spline Fault Tracking' 52 will then determine a second plurality of 'crosscorrelation values (C0'), (C1'), (C2'), (C3'), and (C4') for a 3D Volume' (in the manner described above with reference to FIGS. 21A and 21B) associated, respectively, with a corresponding 'second plurality of 3D Volumes' (as discussed above with reference to FIGS. 22 and 23). A 'second minimum one' of the 'crosscorrelation values (C0'), (C1'), (C2'), (C3'), and (C4') for a 3D Volume' is selected. The 'second Derived Fault Segment' corresponding to that 'second minimum one' of the 'crosscorrelation values (C0'), (C1'), (C2'), (C3'), and (C4') for a 3D Volume' also lies on the fault surface 58. This process repeats until a 'subsequent minimum one' of the 'crosscorrelation values (C0'), (C1'), (C2'), (C3'), and (C4') for a 3D Volume' is not above a threshold value (i.e., is less than or equal to the threshold value), or if the end of the volume is reached, step 52i in FIG. 8. Therefore, the fault surface 58 of FIG. 24 is defined by the seed segment and the 'Derived Fault Segments' that are associated with the plurality of 'minimum ones' of the 'crosscorrelation values'. For example, the 'first Derived Fault Segment' associated with the 'first minimum one' of the 'crosscorrelation values C0, C1, C2, C3, C4 for a 3D Volume' and the 'second Derived Fault Segment' associated with the 'second minimum one' of the 'crosscorrelation values (C0'), (C1'), (C2'), (C3'), and (C4') for a 3D Volume' will lie on the 'fault surface' 58. As a result, the 'first Derived Fault Segment' and the 'second Derived Fault Segment' will both tend to define the 'fault surface' 58 of FIG. 24.

The above referenced 'first plurality of 3D Volumes' and 'second plurality of 3D Volumes' are discussed below with reference to FIG. 22.

In FIG. 22, a 'first 3D Volume', associated with the 'first plurality of 3D Volumes', is defined by the first Seed Segment 84 and the Target Segment 102 and is similar to the 3D Volume illustrated in FIG. 15. A crosscorrelation value (C0) is calculated in connection with the 'first 3D Volume' that is defined by Seed Segment 84 and Target Segment 102, the crosscorrelation value (C0) being calculated in the manner illustrated in FIGS. 21A and 21B.

In FIG. 22, a 'second 3D Volume', associated with the 'first plurality of 3D Volumes', is defined by the first Seed Segment 84 and the Target Segment 104 and is similar to the 3D Volume illustrated in FIG. 15. A crosscorrelation value (C1) is calculated in connection with the 'second 3D Volume' that is defined by Seed Segment 84 and Target Segment 104, the crosscorrelation value (C1) being calculated in the manner illustrated in FIGS. 21A and 21B.

In FIG. 22, a 'third 3D Volume', associated with the 'first plurality of 3D Volumes', is defined by the first Seed Segment 84 and the Target Segment 106 and is similar to the 3D Volume illustrated in FIG. 15. A crosscorrelation value (C2) is calculated in connection with the 'third 3D Volume' that is defined by Seed Segment 84 and Target Segment 106, the crosscorrelation value (C2) being calculated in the manner illustrated in FIGS. 21A and 21B.

In FIG. 22, a 'fourth 3D Volume', associated with the 'first plurality of 3D Volumes', is defined by the first Seed Segment 84 and the Target Segment 108 and is similar to the 3D Volume illustrated in FIG. 15. A crosscorrelation value (C3) is calculated in connection with the 'fourth 3D Volume' that is defined by Seed Segment 84 and Target Segment 108, the crosscorrelation value (C3) being calculated in the manner illustrated in FIGS. 21A and 21B.

In FIG. 22, a 'fifth 3D Volume', associated with the 'first plurality of 3D Volumes', is defined by the first Seed Segment 84 and the Target Segment 110 and is similar to the 3D Volume illustrated in FIG. 15. A crosscorrelation value (C4) is calculated in connection with the 'fifth 3D Volume' that is defined by Seed Segment 84 and Target Segment 110, the crosscorrelation value (C4) being calculated in the manner illustrated in FIGS. 21A and 21B.

In FIG. 22, assuming that 'C1' is the 'minimum one' of C0, C1, C2, C3, and C4, and recalling that the Target Segment 104 corresponds to the crosscorrelation value 'C1', then, the Target Segment 104 must lie on the fault surface 58 of FIGS. 7B and 24. In addition, the Target Segment 104 will now be designated the first derived fault segment 112.

In FIG. 22, a 'sixth 3D Volume', associated with the 'second plurality of 3D Volumes', is defined by the first derived fault segment 112 and the Target Segment 116 and is similar to the 3D Volume illustrated in FIG. 15. A crosscorrelation value (C0') is calculated in connection with the 'sixth 3D Volume' that is defined by the first derived fault segment 112 and Target Segment 116, the crosscorrelation value (C0') being calculated in the manner illustrated in FIGS. 21A and 21B.

In FIG. 22, a 'seventh 3D Volume', associated with the 'second plurality of 3D Volumes', is defined by the first derived fault segment 112 and the Target Segment 118 and is similar to the 3D Volume illustrated in FIG. 15. A crosscorrelation value (C1') is calculated in connection with the 'seventh 3D Volume' that is defined by the first derived fault segment 112 and Target Segment 118, the crosscorrelation value (C1') being calculated in the manner illustrated in FIGS. 21A and 21B.

In FIG. 22, a 'eighth 3D Volume', associated with the 'second plurality of 3D Volumes', is defined by the first derived fault segment 112 and the Target Segment 120 and is similar to the 3D Volume illustrated in FIG. 15. A crosscorrelation value (C2') is calculated in connection with the 'eighth 3D Volume' that is defined by the first derived fault segment 112 and Target Segment 120, the crosscorrelation value (C2') being calculated in the manner illustrated in FIGS. 21A and 21B.

In FIG. 22, a 'ninth 3D Volume', associated with the 'second plurality of 3D Volumes', is defined by the first derived fault segment 112 and the Target Segment 122 and is similar to the 3D Volume illustrated in FIG. 15. A crosscorrelation value (C3') is calculated in connection with the 'ninth 3D Volume' that is defined by the first derived fault segment 112 and Target Segment 122, the crosscorrelation value (C3') being calculated in the manner illustrated in FIGS. 21A and 21B.

In FIG. 22, a 'tenth 3D Volume', associated with the 'second plurality of 3D Volumes', is defined by the first derived fault segment 112 and the Target Segment 124 and is similar to the 3D Volume illustrated in FIG. 15. A crosscorrelation value (C4') is calculated in connection with the 'tenth 3D Volume' that is defined by the first derived fault segment 112 and Target Segment 124, the crosscorrelation value (C4') being calculated in the manner illustrated in FIGS. 21A and 21B.

In FIG. 22, assuming that (C3') is the 'minimum one' of (C0'), (C1'), (C2'), (C3'), and (C4'), and recalling that the Target Segment 122 corresponds to the crosscorrelation value (C3'), then, the Target Segment 122 must lie on the fault surface 58 of FIGS. 7B and 24. In addition, the Target Segment 122 would now be designated the second derived fault segment for purposes of 'subsequent repeat processing'.

If the crosscorrelation value (C3') is not above Threshold, as indicated in step 52i of FIG. 8, or if the end of the volume is reached, the 'subsequent processing' ends, step 52j of FIG. 8.

In FIG. 24, since segment 104 must lie within the fault surface 58 of FIGS. 7B and 24, and segment 122 must also lie within the fault surface 58 of FIGS. 7B and 24, in FIG. 24, the fault surface 58 must include Target Segments 122 and 104. The Target Segments 122 and 104 will tend to define the fault surface 58.

The above description of the 'Fault Interpretation Software including Spline Fault Tracking' being thus described, it will be obvious that the same may be varied in many ways. Such variations are not to be regarded as a departure from the spirit and scope of the claimed method or system or program storage device or computer program, and all such modifications as would be obvious to one skilled in the art are intended to be included within the scope of the following claims.

We claim:

1. A method of producing underground deposits of hydrocarbon from a formation, comprising:
determining a fault surface in said formation, the step of determining said fault surface in said formation including:
determining a first plurality of crosscorrelation values for a 3D Volume, wherein the first plurality of crosscorrelation values are associated, respectively, with a corresponding first plurality of 3D Volumes, wherein the first plurality of 3D Volumes are defined by a seed segment and respective target segments, wherein said first plurality of crosscorrelation values are computed by cross-correlating values of voxels in a first layer and values of voxels in a second layer, wherein the first and second layers are separated by said fault surface; and
selecting a first minimum one of the first plurality of crosscorrelation values, a first derived fault segment corresponding to said first minimum one of the first plurality of crosscorrelation values, said first derived fault segment approximately lying on said fault surface, wherein said first derived fault segment is one of the target segments that corresponds to said first minimum one of the first plurality of crosscorrelation values; and
after the fault surface is determined, drilling said formation in order to produce said underground deposits of hydrocarbon from said formation.

2. The method of claim 1, wherein the step of determining said fault surface in said formation further comprises:
determining a second plurality of crosscorrelation values for a 3D Volume associated, respectively, with a corresponding second plurality of 3D Volumes; and
selecting a second minimum one of the second plurality of crosscorrelation values, a second derived fault segment corresponding to said second minimum one of the second plurality of crosscorrelation values, said first derived fault segment and said second derived fault segment approximately lying on said fault surface.

3. A method of producing underground deposits of hydrocarbon from a formation, comprising:
determining a fault surface in said formation, the step of determining said fault surface in said formation including:
determining a first plurality of crosscorrelation values for a 3D Volume associated, respectively, with a corresponding first plurality of 3D Volumes; and
selecting a first minimum one of the first plurality of crosscorrelation values, a first derived fault segment corresponding to said first minimum one of the first plurality of crosscorrelation values, said first derived fault segment approximately lying on said fault surface; and
when the fault surface is determined, drilling said formation in order to produce said underground deposits of hydrocarbon from said formation,
wherein the step of determining said fault surface in said formation further comprises:
determining a second plurality of crosscorrelation values for a 3D Volume associated, respectively, with a corresponding second plurality of 3D Volumes; and
selecting a second minimum one of the second plurality of crosscorrelation values, a second derived fault segment corresponding to said second minimum one of the second plurality of crosscorrelation values, said first derived fault segment and said second derived fault segment approximately lying on said fault surface, wherein the step of determining a first plurality of crosscorrelation values for a 3D Volume and the step of determining a second plurality of crosscorrelation values for a 3D Volume comprises:

solving a particular equation for C(A,B), said C(A,B) representing said first plurality of crosscorrelation values for a 3D Volume and said second plurality of crosscorrelation values for a 3D Volume, said particular equation including:

$$C(A, B) = \frac{2\sum_{i,j,k}(A_{ijk} * B_{ijk})}{\sum_{i,j,k}(A_{ijk}^2 + B_{ijk}^2)}$$

where $A_{ijk}$ and $B_{ijk}$ are voxel values.

4. A system adapted for producing underground deposits of hydrocarbon from a formation, comprising:

apparatus adapted for determining a fault surface in said formation, the apparatus adapted for determining said fault surface in said formation including:

apparatus adapted for determining a first plurality of crosscorrelation values for a 3D Volume associated, respectively, with a corresponding first plurality of 3D Volumes, wherein the first plurality of 3D Volumes are defined by a seed segment and respective target segments, wherein said first plurality of crosscorrelation values are computed by cross-correlating values of voxels in a first layer and values of voxels in a second layer, wherein the first and second layers are separated by said fault surface; and apparatus adapted for selecting a first minimum one of the first plurality of crosscorrelation values, a first derived fault segment corresponding to said first minimum one of the first plurality of crosscorrelation values, said first derived fault segment approximately lying on said fault surface, wherein said first derived fault segment is one of the target segments that corresponds to said first minimum one of the first plurality of crosscorrelation values; and apparatus adapted for drilling said formation in order to produce said underground deposits of hydrocarbon from said formation on the condition that the fault surface is determined.

5. The system of claim 4, wherein the apparatus adapted for determining said fault surface in said formation further comprises:

apparatus adapted for determining a second plurality of crosscorrelation values for a 3D Volume associated, respectively, with a corresponding second plurality of 3D Volumes; and apparatus adapted for selecting a second minimum one of the second plurality of crosscorrelation values, a second derived fault segment corresponding to said second minimum one of the second plurality of crosscorrelation values, said first derived fault segment and said second derived fault segment approximately lying on said fault surface.

6. A system adapted for producing underground deposits of hydrocarbon from a formation, comprising:

apparatus adapted for determining a fault surface in said formation, the apparatus adapted for determining said fault surface in said formation including:

apparatus adapted for determining a first plurality of crosscorrelation values for a 3D Volume associated, respectively, with a corresponding first plurality of 3D Volumes; and apparatus adapted for selecting a first minimum one of the first plurality of crosscorrelation values, a first derived fault segment corresponding to said first minimum one of the first plurality of crosscorrelation values, said first derived fault segment approximately lying on said fault surface; and apparatus adapted for drilling said formation in order to produce said underground deposits of hydrocarbon from said formation on the condition that the fault surface is determined, wherein the apparatus adapted for determining said fault surface in said formation further comprises:

apparatus adapted for determining a second plurality of crosscorrelation values for a 3D Volume associated, respectively, with a corresponding second plurality of 3D Volumes; and apparatus adapted for selecting a second minimum one of the second plurality of crosscorrelation values, a second derived fault segment corresponding to said second minimum one of the second plurality of crosscorrelation values, said first derived fault segment and said second derived fault segment approximately lying on said fault surface, wherein the apparatus adapted for determining a first plurality of crosscorrelation values for a 3D Volume and the apparatus adapted for determining a second plurality of crosscorrelation values for a 3D Volume comprises:

apparatus adapted for solving a particular equation for C(A,B), said C(A,B) representing said first plurality of crosscorrelation values for a 3D Volume and said second plurality of crosscorrelation values for a 3D Volume, said particular equation including:

$$C(A, B) = \frac{2\sum_{i,j,k}(A_{ijk} * B_{ijk})}{\sum_{i,j,k}(A_{ijk}^2 + B_{ijk}^2)}$$

where $A_{ijk}$ and $B_{ijk}$ are voxel values.

7. A method for determining a fault surface in a formation, comprising:

determining, by a computer, a first plurality of crosscorrelation values for a 3D Volume associated, respectively, with a corresponding first plurality of 3D Volumes, wherein the first plurality of 3D Volumes are defined by a seed segment and respective target segments, wherein said first plurality of crosscorrelation values are computed by cross-correlating values of voxels in a first layer and values of voxels in a second layer, wherein, the first and second layers are separated by said fault surface; and selecting, by the computer, a first minimum one of the first plurality of crosscorrelation values, a first derived fault segment corresponding to said first minimum one of the first plurality of crosscorrelation values, said first derived fault segment approximately lying on said fault surface and tending to determine said fault surface in said formation, wherein said first derived fault segment is one of the target segments that corresponds to said first minimum one of the first plurality of crosscorrelation values.

8. The method of claim 7, wherein the method for determining said fault surface in said formation further comprises:

determining a second plurality of crosscorrelation values for a 3D Volume associated, respectively, with a corresponding second plurality of 3D Volumes; and selecting a second minimum one of the second plurality of crosscorrelation values, a second derived fault segment corresponding to said second minimum one of the second plurality of crosscorrelation values, said first derived fault segment and said second derived fault segment approximately lying on said fault surface.

9. A method for determining a fault surface in a formation, comprising:

determining, by a computer, a first plurality of crosscorrelation values for a 3D Volume associated, respectively, with a corresponding first plurality of 3D Volumes; and selecting, by the computer, a first minimum one of the first plurality of crosscorrelation values, a first derived fault segment corresponding to said first minimum one of the first plurality of crosscorrelation values, said first derived fault segment approximately lying on said fault surface and tending to determine said fault surface in said formation, wherein the method for determining said fault surface in said formation further comprises:

determining a second plurality of crosscorrelation values for a 3D Volume associated, respectively, with a corresponding second plurality of 3D Volumes; and selecting a second minimum one of the second plurality of crosscorrelation values, a second derived fault segment corresponding to said second minimum one of the second plurality of crosscorrelation values, said first derived fault segment and said second derived fault segment approximately lying on said fault surface, and wherein the step of determining a first plurality of crosscorrelation values for a 3D Volume and the step of determining a second plurality of crosscorrelation values for a 3D Volume comprises:

solving a particular equation for C(A,B), said C(A,B) representing said first plurality of crosscorrelation values for a 3D Volume and said second plurality of crosscorrelation values for a 3D Volume, said particular equation including:

$$C(A,B) = \frac{2\sum_{i,j,k}(A_{ijk} * B_{ijk})}{\sum_{i,j,k}(A_{ijk}^2 + B_{ijk}^2)}$$

where $A_{ijk}$ and $B_{ijk}$ are voxel values.

10. A program storage device readable by a machine tangibly embodying a set of instructions executable by the machine to perform method steps for determining a fault surface in a formation, said method steps comprising:

determining a first plurality of crosscorrelation values for a 3D Volume associated, respectively, with a corresponding first plurality of 3D Volumes, wherein the first plurality of 3D Volumes are defined by a seed segment and respective target segments, wherein said first plurality of crosscorrelation values are computed by cross-correlating values of voxels in a first layer and values of voxels in a second layer, wherein the first and second layers are separated by said fault surface; and selecting a first minimum one of the first plurality of crosscorrelation values, a first derived fault segment corresponding to said first minimum one of the first plurality of crosscorrelation values, said first derived fault segment approximately lying on said fault surface and tending to determine said fault surface in said formation, wherein said first derived fault segment is one of the target segments that corresponds to said first minimum one of the first plurality of crosscorrelation values.

11. The program storage device of claim 10, wherein the method for determining said fault surface in said formation further comprises:

determining a second plurality of crosscorrelation values for a 3D Volume associated, respectively, with a corresponding second plurality of 3D Volumes; and selecting a second minimum one of the second plurality of crosscorrelation values, a second derived fault segment corresponding to said second minimum one of the second plurality of crosscorrelation values, said first derived fault segment and said second derived fault segment approximately lying on said fault surface.

12. A program storage device readable by a machine tangibly embodying a set of instructions executable by the machine to perform method steps for determining a fault surface in a formation, said method steps comprising:

determining a first plurality of crosscorrelation values for a 3D Volume associated, respectively, with a corresponding first plurality of 3D Volumes; and selecting a first minimum one of the first plurality of crosscorrelation values, a first derived fault segment corresponding to said first minimum one of the first plurality of crosscorrelation values, said first derived fault segment approximately lying on said fault surface and tending to determine said fault surface in said formation, wherein the method for determining said fault surface in said formation further comprises:

determining a second plurality of crosscorrelation values for a 3D Volume associated, respectively, with a corresponding second plurality of 3D Volumes; and selecting a second minimum one of the second plurality of crosscorrelation values, a second derived fault segment corresponding to said second minimum one of the second plurality of crosscorrelation values, said first derived fault segment and said second derived fault segment approximately lying on said fault surface, wherein the step of determining a first plurality of crosscorrelation values for a 3D Volume and the step of determining a second plurality of crosscorrelation values for a 3D Volume comprises:

solving a particular equation for C(A,B), said C(A,B) representing said first plurality of crosscorrelation values for a 3D Volume and said second plurality of crosscorrelation values for a 3D Volume, said particular equation including:

$$C(A,B) = \frac{2\sum_{i,j,k}(A_{ijk} * B_{ijk})}{\sum_{i,j,k}(A_{ijk}^2 + B_{ijk}^2)}$$

where $A_{ijk}$ and $B_{ijk}$ are voxel values.

13. A system adapted for determining a fault surface in a formation, comprising:

apparatus adapted for determining a first plurality of crosscorrelation values for a 3D Volume associated, respectively, with a corresponding first plurality of 3D Volumes, wherein the first plurality of 3D Volumes are defined by a seed segment and respective target segments, wherein said first plurality of crosscorrelation values are computed by cross-correlating values of voxels in a first layer and values of voxels in a second layer, wherein the first and second layers are separated by said fault surface; and apparatus adapted for selecting a first minimum one of the first plurality of crosscorrelation values, a first derived fault segment corresponding to said first minimum one of the first plurality of crosscorrelation values, said first derived fault segment approximately lying on said fault surface, wherein said first derived fault segment is one of the target segments that corresponds to said first minimum one of the first plurality of crosscorrelation values.

14. The system of claim 13, wherein the system adapted for determining a fault surface in a formation further comprises:
apparatus adapted for determining a second plurality of crosscorrelation values for a 3D Volume associated, respectively, with a corresponding second plurality of 3D Volumes; and
apparatus adapted for selecting a second minimum one of the second plurality of crosscorrelation values, a second derived fault segment corresponding to said second minimum one of the second plurality of crosscorrelation values, said first derived fault segment and said second derived Fault segment approximately lying on said fault surface.

15. A system adapted for determining a fault surface in a formation, comprising:
apparatus adapted for determining a first plurality of crosscorrelation values for a 3D Volume associated, respectively, with a corresponding first plurality of 3D Volumes; and
apparatus adapted for selecting a first minimum one of the first plurality of crosscorrelation values, a first derived fault segment corresponding to said first minimum one of the first plurality of crosscorrelation values, said first derived fault segment approximately lying on said fault surface,
wherein the system adapted for determining a fault surface in a formation further comprises:
apparatus adapted for determining a second plurality of crosscorrelation values for a 3D Volume associated, respectively, with a corresponding second plurality of 3D Volumes; and
apparatus adapted for selecting a second minimum one of the second plurality of crosscorrelation values, a second derived fault segment corresponding to said second minimum one of the second plurality of crosscorrelation values, said first derived fault segment and said second derived fault segment approximately lying on said fault surface,
wherein the apparatus adapted for determining a first plurality of crosscorrelation values for a 3D Volume and the apparatus adapted for determining a second plurality of crosscorrelation values for a 3D Volume comprises:
apparatus adapted for solving a particular equation for C(A,B), said C(A,B) representing said first plurality of crosscorrelation values for a 3D Volume and said second plurality of crosscorrelation values for a 3D Volume, said particular equation including:

$$C(A, B) = \frac{2\sum_{i,j,k} (A_{ijk} * B_{ijk})}{\sum_{i,j,k} (A_{ijk}^2 + B_{ijk}^2)}$$

where $A_{ijk}$ and $B_{ijk}$ are voxel values.

16. A method of determining a fault surface, comprising:
creating and projecting, by a computer, a first seed segment and adjusting a target segment to a first position thereby generating a first volume extending between the first seed segment and the target segment at said first position, the first volume including a first plurality of voxels having a corresponding first plurality of voxel values;
calculating, by the computer, a first crosscorrelation value C1(A,B) corresponding to said first volume in response to said first plurality of voxel values;
adjusting, by the computer, said target segment to a second position thereby generating a second volume extending between the first seed segment and the target segment at said second position, the second volume including a second plurality of voxels having a corresponding second plurality of voxel values;
calculating, by the computer, a second crosscorrelation value C2(A,B) corresponding to said second volume in response to said second plurality of voxel values; and
determining, by the computer, a minimum one of said C1(A,B) and said C2(A,B), and selecting a first derived fault segment which corresponds to said minimum one of said C1(A,B) and said C2(A,B), the first derived target segment being at one of the first and second positions corresponding to said minimum one of said C1(A,B), the first derived target segment lying on said fault surface and tending to determine said fault surface.

17. The method of claim 16, further comprising:
projecting the first derived fault segment and adjusting a target segment to a third position thereby generating a third volume extending between the first derived fault segment and the target segment at said third position, the third volume including a third plurality of voxels having a corresponding third plurality of voxel values;
calculating a third crosscorrelation value C3(A,B) corresponding to said third volume in response to said third plurality of voxel values;
adjusting said target segment to a fourth position thereby generating a fourth volume extending between the first derived fault segment and the target segment at said fourth position, the fourth volume including a fourth plurality of voxels having a corresponding fourth plurality of voxel values;
calculating a fourth crosscorrelation value C4(A,B) corresponding to said fourth volume in response to said fourth plurality of voxel values;
determining a minimum one of said C3(A,B) and said C4(A,B), and selecting a second derived fault segment which corresponds to said minimum one of said C3(A,B) and said C4(A,B), the second derived fault segment being at one of the third and fourth positions corresponding to said minimum one of said C3(A,B) and said C4(A,B), the first derived fault segment and said second derived fault segment lying on said fault surface and tending to determine said fault surface.

18. The method of claim 16, wherein adjusting said target segment to said first and second positions comprises shifting said target segment from an original position to said first and second positions.

19. A program storage device readable by a machine tangibly embodying a set of instructions executable by the machine to perform method steps for determining a fault surface, said method steps comprising:

creating and projecting a first seed segment and adjusting a target segment to a first position thereby generating a first volume extending between the first seed segment and the target segment at said first position, the first volume including a first plurality of voxels having a corresponding first plurality of voxel values;

calculating a first crosscorrelation value $C1(A,B)$ corresponding to said first volume in response to said first plurality of voxel values;

adjusting said target segment to a second position thereby generating a second volume extending between the first seed segment and the target segment at said second position, the second volume including a second plurality of voxels having a corresponding second plurality of voxel values;

calculating a second crosscorrelation value $C2(A,B)$ corresponding to said second volume in response to said second plurality of voxel values;

determining a minimum one of said $C1(A,B)$ and said $C2(A,B)$, and selecting a first derived fault segment which corresponds to said minimum one of said $C1(A,B)$ and said $C2(A,B)$, the first derived target segment being at one of the first and second positions corresponding to said minimum one of said $C1(A,B)$ and said $C2(A,B)$, the first derived fault segment lying on said fault surface and tending to determine said fault surface.

20. The program storage device of claim 19, further comprising:

projecting the first derived fault segment and adjusting a target segment to a third position thereby generating a third volume extending between the first derived fault segment and the target segment at said third position, the third volume including a third plurality of voxels having a corresponding third plurality of voxel values;

calculating a third crosscorrelation value $C3(A,B)$ corresponding to said third volume in response to said third plurality of voxel values;

adjusting said target segment to a fourth position thereby generating a fourth volume extending between the first derived fault segment and the target segment at said fourth position, the fourth volume including a fourth plurality of voxels having a corresponding fourth plurality of voxel values;

calculating a fourth crosscorrelation value $C4(A,B)$ corresponding to said fourth volume in response to said fourth plurality of voxel values;

determining a minimum one of said $C3(A,B)$ and said $C4(A,B)$, and selecting a second derived fault segment which corresponds to said minimum one of said $C3(A,B)$ and said $C4(A,B)$, the second derived fault segment being at one of the third and fourth positions corresponding to said minimum one of said $C3(A,B)$ and said $C4(A,B)$, the first derived fault segment and said second derived fault segment lying on said fault surface and tending to determine said fault surface.

21. The program storage device of claim 19, wherein adjusting said target segment to said first and second positions comprises shifting said target segment from an original position to said first and second positions.

* * * * *